(12) United States Patent
Sun et al.

(10) Patent No.: US 7,026,595 B2
(45) Date of Patent: Apr. 11, 2006

(54) LIGHT DETECTOR

(75) Inventors: Hoi-Cheong Steve Sun, Dayton, NJ (US); Rosalyn Ritts, Princeton, NJ (US)

(73) Assignee: Powerzyme, Inc., Monmouth Junction, NJ (US)

( * ) Notice: Subject to any disclaimer, the term of this patent is extended or adjusted under 35 U.S.C. 154(b) by 323 days.

(21) Appl. No.: 10/407,017

(22) Filed: Apr. 4, 2003

(65) Prior Publication Data

US 2003/0222203 A1 Dec. 4, 2003

Related U.S. Application Data

(60) Provisional application No. 60/370,530, filed on Apr. 5, 2002, provisional application No. 60/418,572, filed on Oct. 15, 2002.

(51) Int. Cl.
*H01J 40/14* (2006.01)
(52) U.S. Cl. .................................. 250/207; 250/226
(58) Field of Classification Search ................ 250/207, 250/208.1, 214; 313/528, 529, 530, 540; 429/111, 105; 136/263
See application file for complete search history.

(56) References Cited

U.S. PATENT DOCUMENTS

| | | | | |
|---|---|---|---|---|
| 4,022,950 | A | * 5/1977 | Fong et al. | .................. 429/105 |
| 4,033,673 | A | 7/1977 | Seki | ........................... 359/242 |
| 4,037,029 | A | * 7/1977 | Anderson | .................. 429/111 |

* cited by examiner

*Primary Examiner*—David Porta
*Assistant Examiner*—Tony Lu
(74) *Attorney, Agent, or Firm*—Lerner, David, Littenburg, Kurmholz & Mentlik, LLP

(57) ABSTRACT

A light sensor and method of detecting light using the light sensor are provided. The light sensor includes a container having an anode compartment and a cathode compartment. The anode compartment has an anode and the cathode compartment has a cathode. The container also includes a transparent portion that allows light into the anode compartment. A membrane separates the anode compartment and the cathode compartment. The membrane is able to allow protons to pass from the anode compartment to the cathode compartment. The anode compartment includes a photon-converting compound ("PCC") for generating electrons by reaction with light. Also included are an imaging device and a method of using the imaging device.

26 Claims, 10 Drawing Sheets

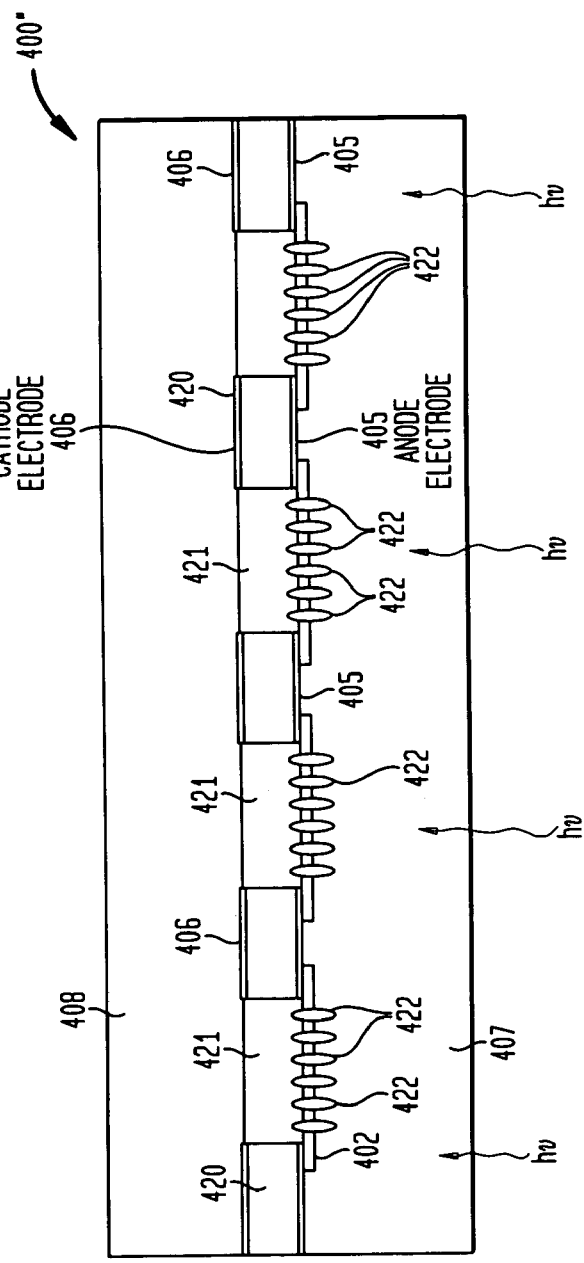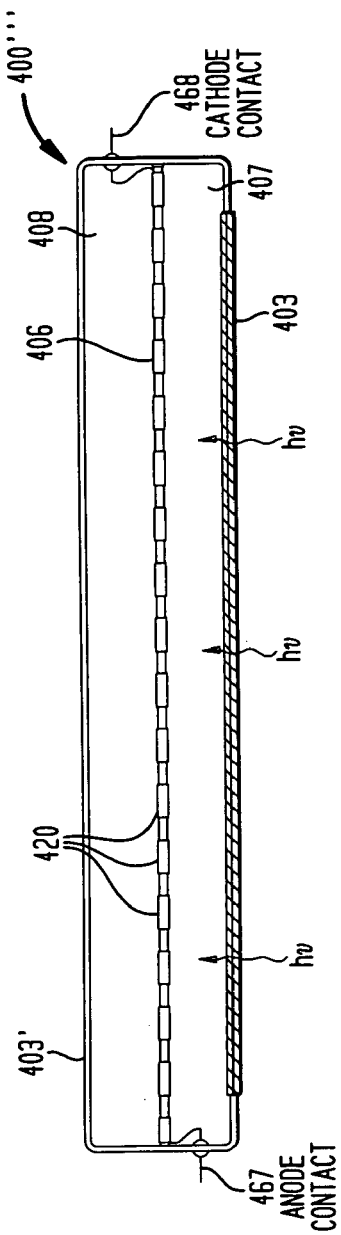

LIGHT DETECTOR

CROSS-REFERENCE TO RELATED APPLICATIONS

The present application claims priority from U.S. Provisional Applications No. 60/370,530, filed Apr. 5, 2002, and No. 60/418,572, filed Oct. 15, 2002, the disclosures of which are hereby incorporated by reference herein.

BACKGROUND OF THE INVENTION

The invention generally relates to methods and devices for detecting, quantifying and analyzing light, as well as for imaging.

'Light' is a form of radiant energy, an electromagnetic radiation whose wavelength is between approximately 100 and 0.01 µm. Visible light has a wavelength between approximately 0.4 to 0.76 µm.

Conventional light sensors include transduction elements that convert electromagnetic radiation into a usable electrical output. Four transduction principles are commonly used: photovoltaic, photoconductive, photoconductive junction, and photoemissive. Modern light sensors incorporate transduction elements that are semiconductor-based.

Quantum efficiency (QE) is the ratio of countable output events to the number of incident photons and is used to gauge the relative performance of transduction elements. For transduction elements, a countable event is generation of an electron in response to a single incident photon. Thus, if one incident photon generates one measurable electron the QE is 100%. Semiconductor-based light sensors generally operate with a QE in the range of about 0.1% to about 35%.

The poor QE means that a photon sensor based on semi-conductors requires numerous photons to produce measurable electrons, thereby having reduced sensitivity.

Reduced sensitivity due to a low QE requires that a low-light imaging device based on semiconductors use enhancing techniques, such as infra-red strobe lights, to increase the number of photons to measure. These techniques add significantly to the cost and size of low-light imaging devices.

Producing an instrument to selectively measure a range of light frequencies (colors) using semiconductor transducers disadvantageously requires bulky, QE-reducing diffraction gratings. Thus, the already-inefficient photon sensor of such a device is further limited by loss of photons due to the diffraction grating.

SUMMARY OF THE INVENTION

The invention generally relates to light detectors, sensors and imaging devices wherein photon-converting compounds ("PCCs") interact with photons to yield electrons and protons, which are then transported to one or more anode(s) and cathode(s), respectively. The number of electrons so produced is related to the number of photons interacting with the PCCs. Electrons may be counted by a current measuring device placed between the anode(s) and cathode(s).

An aspect of the present invention is a light detector including a container having an anode compartment and a cathode compartment. The anode compartment includes an anode, and the cathode compartment includes a cathode. A transparent portion in the container allows light into the anode compartment, which is separated from the cathode compartment by a membrane that allows protons to pass. A PCC is in the anode compartment.

In an embodiment of the invention, a current measuring device is connected between the anode and the cathode to measure the flow of electrons from the anode to the cathode.

In another embodiment of the invention, the PCC can be a cytochrome having porphyrin rings containing a metal or metal ion. In an embodiment the PCC may be selected from the group consisting of chlorophylls, beta-carotene, or any molecule with a porphyrin ring that can react with $H_2O$ to form oxygen. In other embodiments the PCC may be a combination of compounds. The PCC may be associated with the membrane or free-floating in the anode compartment.

Another embodiment of the invention includes electron carriers also within the anode compartment. An embodiment of the invention includes PCCs immobilized onto the anode electrode with an electron carrier. Another embodiments further includes electron transfer mediators. In an embodiment the electron transfer mediators are coated onto the anodes.

In an embodiment of the invention the membrane that allows protons to pass is a biocompatible membrane. In another embodiment of the invention, the membrane is a proton tunneling membrane ("PTM"). In still another embodiment the membrane is a proton exchange membrane ("PEM").

Another embodiment of the invention includes one or more lenses positioned at the transparent portion of the container.

Yet another embodiment of the present invention includes a barrier used to support the membrane separating the anode compartment from the cathode compartment. An embodiment includes a barrier having a plurality of pores, with the pores being filled or covered with the membrane.

Another aspect of the present invention includes a light detector as described above in which one or more light filters are interposed between the light source and the anode compartment to filter light entering the anode compartment. In an embodiment of the invention a barrier is used to support the membrane separating the anode compartment from the cathode compartment. The barrier has a plurality of pores which are filled or covered with the membrane. One or more light filters are interposed between the anode compartment and the membrane to filter light entering and traversing the anode compartment prior to arriving at the membrane.

In another aspect of the invention, the light detector includes a barrier composed of a dielectric material and the anode is plated to or otherwise in contact with the dielectric material.

Another aspect of the invention includes a light detector as described above in which the anode is actually an array of anodes. It includes a a light diffracting device occupying the transparent portion of the container, oriented to diffract light entering the anode compartment into incident component colored light, which then traverses the anode compartment and radiates onto a barrier supporting the membrane separating the anode compartment from the cathode compartment. The barrier has an array of pores, the pores being filled or covered with the membrane, and the barrier is composed of a dielectric material. The barrier also includes the array of anodes, with each anode plated to or in contact with the dielectric material of the barrier and each adjacent to and electrically isolating one or more of the pores, forming bands positioned coincident with a portion of the barrier at which known colors of the incident component colored light are diffracted unto. In an embodiment of the invention the light diffracting device is a diffraction grating.

In another embodiment the light diffracting device includes a diffraction grating and one or more lenses.

Another aspect of the invention includes an imaging device. The imaging device includes a container having a transparent portion allowing light from an image source to pass thru the transparent portion into an anode compartment of the container. The anode compartment includes an array of anodes each having an anode trace. The container also includes a cathode compartment having a cathode. The anode compartment and the cathode compartment are separated by a barrier having an array of pores. The pores are filled with a membrane allowing protons to pass. PCCs are associated with the membrane. Each of the pores are electrically isolated by and adjacent to one of the anodes. A lens arrangement is provided at the transparent portion of the container for focusing the light passing into the anode compartment from the image source and onto the barrier. Each anode trace is electrically connected to the cathode.

Another aspect of the invention is an imaging device comprising a container with a transparent portion allowing light from an image source to pass thru the transparent portion into an anode compartment of the container. The anode compartment has an array of anodes. Each anode has an anode trace. The container also has at least one cathode compartment, the at least one cathode compartment with one or more cathode. A dielectric barrier with an array of pores, separating the anode compartment and the cathode compartment. The pores are filled with a membrane allowing protons to pass. PCCs are associated with the membrane. The pores each have a filter allowing a predetermined color of light to pass, with each filter interposed between the transparent portion of the container and the pore. The pores are each electrically isolated by and adjacent to one of the anodes. A lens arrangement is also provided for focusing the light passing into the anode compartment from the image source, through the filters and onto the barrier. Each anode trace is electrically connected to the cathode.

In another aspect of the invention, methods of detecting light using the light detecting apparatus described above are provided. A method of detecting light including passing the light through transparent portion(s) of a container into an anode compartment, where the light interacts with PCCs to produce an electrons and protons, and passing the electrons to the anode and further over an electrical connection to a cathode compartment, while the protons pass through a membrane separating the anode and cathode compartments. In one embodiment of the invention, the light is filtered by one or more light filters interposed between the light source and the anode compartment. In another embodiment of the invention, the membrane is supported by a barrier with pores, which are filled with the membrane. The filtering of light is performed with filters placed between the anode compartment and the membrane. In another embodiment the various filters are used to filter to light reaching the pores differentially. The anodes are individually addressable and each associated with one or more pores which use similar filters.

In another embodiment of the invention, light entering the anode compartment is diffracted using a light diffracting device. The diffracted light then radiates onto the barrier containing the array of pores with the membrane separating the anode compartment from the cathode compartment, where the electrons moving from each anode trace to the cathode are counted. In an embodiment of the invention the light diffracting device is a prism. In another embodiment, the light diffracting device is a diffraction grating.

Another aspect of the invention is a imaging method in which light from an image source passes through a transparent portion of container into the anode compartment. The anode compartment includes an array of anodes each having an anode trace. The container also includes a cathode compartment with a cathode. The anode and cathode compartments are separated by a barrier having an array of pores. The pores are filled with a membrane allowing protons to pass. The membrane has PCCs associated therewith. The pores are each electrically isolated by and adjacent to one of the anodes. Light is focused onto the barrier by a lens arrangement located at the transparent portion of the container. Electrons produced by the PCCs interacting with the light at the membranes in each of the array of pores at the barrier then migrate to by the anode electrically isolating each pore. The electrons thus captured by each anode are then passed over each anode trace to an electrical connection and onto the cathode. In an embodiment, an electronic representation of the source image is then generated.

Another aspect of the invention includes the imaging method described above in which the light is filtered at each pore. In an embodiment a color electronic representation of the source image is generated.

BRIEF DESCRIPTION OF THE DRAWINGS

FIG. 4A depicts an exemplary barrier and membrane in accordance with an embodiments of the invention;

FIG. 4B depicts an exemplary barrier and membrane in accordance with an embodiments of the invention;

DETAILED DESCRIPTION

Figure 1:
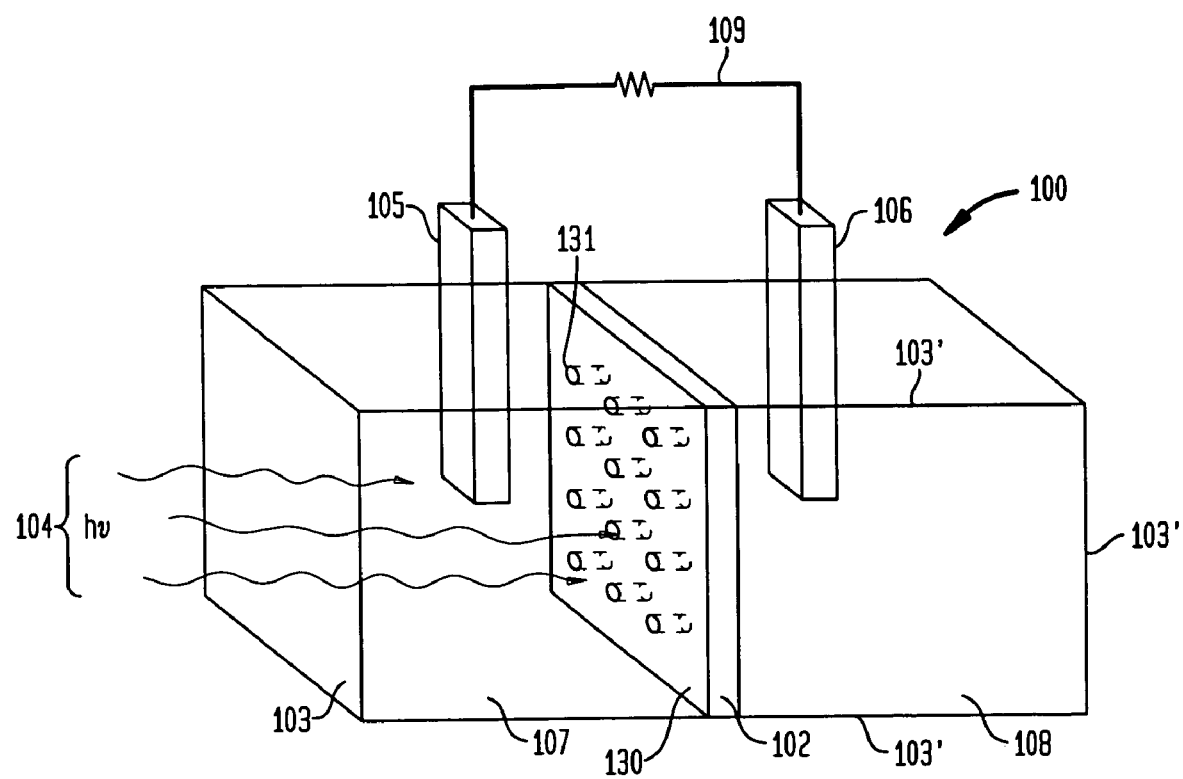
FIG. 1 depicts an exemplary photon sensor in accordance with the present invention.

"Associated" in accordance with the present invention can mean a number of things depending on the circumstances. A polypeptide can be associated with a membrane, such as a biocompatible membrane, proton exchange membrane ("PEM") or a proton tunneling membrane ("PTM"), by being bound to one or more of the surfaces thereof, and/or by being wedged or bound within one or more of the surfaces of the membrane (such as in recesses or pores). An "associated" polypeptide can also be disposed within the interior of the membrane or in a vesicle or lumen contained within the membrane. Polypeptides could also be disposed between successive layers. Polypeptides may be embedded in the membrane as well. Indeed, in a particularly preferred embodiment, the polypeptide is embedded or integrated in the membrane in such a way that it is at least partially exposed through at least one surface of the membrane.

In any of these configurations, what is important is that the associated polypeptide can function within the device for its intended purpose. A polypeptide which will participate in the transport of protons across the membrane, for example, may participate in a redox reaction or participate in the polypeptide mediated transporting of a proton, or proton-tunneling as a method of moving protons from one side of the membrane to the other. Other polypeptides that may be associated with a membrane include photon-converting compounds ("PCCs"), which can react with light and participate in transferring energy to the system and/or transporting protons across the membrane.

The term "participate" in the context of transporting a proton from one side of a membrane to the other includes active transport where, for example, the polypeptide physically or chemically "pumps" the proton across the membrane, usually, but not exclusively, against a pH, concentration or charge gradient or any other active transport mechanism. However, participation need not be so limited. The mere presence of the polypeptide in the membrane may alter the structure or properties of the membrane sufficiently to allow a proton to be transported from a relatively high proton concentration to a relatively low proton concentration on the other side of the membrane. This may be, but is not necessarily a passive, non-selective process such as might result from the use of non-selective, passive pore formers or from simple diffusion (PEM membranes). Indeed, in some cases, inactivation of the polypeptides in a membrane provides results that are inferior to similar membranes made without polypeptides at all. These processes (excluding passive diffusion) are collectively referred to as "polypeptide mediated transport" where the presence of the polypeptide plays a role in the transporting of a species across the membrane, in ways other than merely structurally providing a static channel. Stated another way, "polypeptide mediated transport" means that the presence of the polypeptide results in effective transport from one side of the membrane to the other in response to something other than just concentration. "Participate," in the context of a redox reaction, means that the polypeptide causes or facilitates the oxidation and/or reduction of a species, or conveys to or from that reaction protons, electrons or oxidized or reduced species. In the context of PTMs, "participate" means allowing proton tunneling across the PTM, usually in response to a charge differential on either side of the PTM, as well as potentially participating in redox reaction chemistry. It is possible that a polypeptide associated with a PTM participates in the transport of protons in one or more ways. It may act as a redbx enzyme, which reacts with an electron carrier to release protons and electrons. It may actively transport protons across the membrane. It may act as a conduit for getting protons into a PTM and thereafter the PTM, may through proton-tunneling or in some other fashion, complete the transport across the membrane. It could also do any two or all three of these. Conceivably, an associated polypeptide might, in addition to, or instead of one or more of these functions, also participate in the transfer of protons and electrons to an electron carrier.

"Membrane" as used herein is one or more layers of a synthetic polymeric material forming a sheet, plug or other structure that can be used, alone, or in conjunction with a barrier, and in many embodiments, is substantially impermeable to molecules, atoms and protons. In the context of a PEM, the membrane is preferably impermeable to chemical species other than protons. In the context of a biocompatible membrane or a PTM, the membrane is preferably relatively proton impermeable. Preferably the membranes are substantially totally impermeable to chemical species other than protons and the majority of any current across the membrane comes from something other than the passing or permeation of protons.

A "biocompatible membrane" is a membrane made of synthetic polymer materials that will not incapacitate or otherwise block all of the functionality of a polypeptide when they are associated with one another. A biocompatible membrane in this context will pump or, through some other form of polypeptide-mediated transport, participate in the transport of protons from one side of a layer to another.

A PTM is a membrane that is believed to operate using proton-tunneling across quantum wells, as well as by other possible means. PTMs, proton-tunneling and quantum wells are described in further detail below. PEMs are known in the art and are also further described below. A PTM may also be produced using polypeptides that can participate in proton transfer. These may be used in combination of a plurality of membranes. These will all be generically referred to herein as "membranes".

A "barrier" is a structural support used to support a membrane, where such support is necessary. The barrier can also be an insulator separating membranes that are individual detectors in embodiments such as imagers.

"Polypeptide(s)" includes at least one molecule composed of four or more amino acids that is capable of participating in a chemical reaction, often as a catalyst, or participating in the transporting of a molecule, atom, proton or electron from one side of a membrane (a biocompatible membrane, PTM, etc.) to another, or participating in the formation of molecular structures that facilitate or enable such reactions or transport. Preferably, polypeptides participate in the release of protons and/or their transport across a membrane. The polypeptide can be single stranded, multiple stranded, can exist in a single subunit or multiple subunits. It can be made up of exclusively amino acids or combinations of amino acids and other molecules. This can include, for example, pegalated peptides, peptide nucleic acids, peptide mimetics, neucleoprotein complexes. Strands of amino acids that include such modifications as glycosolation are also contemplated. Polypeptides in accordance with the present invention are generally biological molecules or derivatives or conjugates of biological molecules. Polypeptides can therefore include molecules that can be isolated, as well as molecules that can be produced by recombinant technology or which must be, in whole or in part, chemically synthesized. The term therefore encompasses naturally occurring proteins and enzymes, mutants of same, derivatives and conjugates of same, as well as wholly synthetic amino acid sequences and derivatives and conjugates thereof. In one preferred embodiment, polypeptides in accordance with the present invention can participate in the transporting of molecules, atoms, protons and/or electrons from one side of a membrane to another side thereof, can participate in oxidation or reduction, or are charge driven proton pumping polypeptides such as DH$^-$ Complex I (also referred to as "Complex 1").

PCCs are molecules that can receive and interact with light and proton and electron donators in the medium so as to translate energy from light into chemical energy via the transfer of protons and electrons. PCCs include any molecule able to absorb light, which then uses the energy of the absorbed light to remove electons and protons from an unwilling donor, such as $H_2O$, and then transfers electrons to an electron carrier, such as NADP+ or NAD+. The reaction results in the formation of oxygen, protons and electrons:

Light, PCC

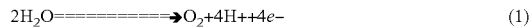
$$2H_2O =\!=\!=\!=\!=\!=\!=\!=\!\to O_2 + 4H + +4e- \qquad (1)$$

PCCs preferably include cytochromes having porphyrin rings and contain a metal or ionic species; such as Fe or Mg. Examples include chlorophylls, such as chlorophyll-a, and chlorophyll-b, beta-carotene, or any molecule with a porphyrin ring that can react with $H_2O$ to form oxygen, cleaving electrons and protons in the process. Or any such molecule that can react without oxygen, such as H2 or H2S in reactions like:

$$H_2 =\!=\!=\!=\!=\!=\!\to 2H + +2e-, \text{ or} \qquad (2)$$

$$H_2S =\!=\!=\!=\!=\!=\!\to 2H + +2e- + S \qquad (3)$$

wherein no oxygen is generated.

PCCs may also be part of a polypeptide complex that can pump protons. For example, the LH1 complex of *Rhodopseudomonas acidophilia* may be used. In such a case, an enzyme is preferred to cleave electrons and protons from electron carriers.

A discussion of light adsorption, $H_2O$ cleavage with exemplary molecules, and electron and proton chemistry and transport is given in another context in Molecular Cell Biology, 4$^{th}$ Edition, H. Lodish, A. Berk, S. L. Zipursky, P. Matsudaira, D. Baltimore and J. Darnell, W. H. Freeman and Company, pages 648–655. These pages are hereby incorporated by reference.

The text and drawings of U.S. patent application Ser. No. 10/213,530, filed on Aug. 7, 2002, naming Rosalyn Ritts and Hoi-Cheong Steve Sun as inventors and commonly assigned to PowerZyme, Inc. are hereby incorporated by reference.

FIG. 1 (all Figure references are to the figures attached to this document, and those mentioned immediately above, unless indicated otherwise) depicts an exemplary photon sensor 100 of the present invention. The photon sensor 100 includes an anode compartment 107 and a cathode compartment 108, separated by a barrier 102. The anode and cathode compartments 107, 108 include an anode 105, and a cathode 106, electrically connected via a current measuring device 109 (pictured here as a resistor).

The barrier 102 is preferably comprised of a dielectric material, such as KAPTON available from DuPont such as a layer 1 mil thick and may be porous or may contain one or more apertures of, for example, 100 microns width. The aperture size may alternatively be smaller, such as 25 microns. Dielectric as used herein refers to material that normally prevents charged particles, whether electrons, protons or other charged species from passing through the material. The multiplicity of apertures may be preferably arranged in a grid or array. Such an array of apertures can have a density as high as 1,600/cm$^2$.

The barrier 102 which includes pores or apertures 130 are preferably filled or covered with a membrane 131 which can be a biocompatible membrane, proton tunneling membrane (PTM), or proton exchange membrane (PEM), possibly also incorporating PCCs. Any other type of membrane usable in this system to produce light detection is also contemplated. These membranes 131 preferably allow the passage of protons and optionally other positive species, but are most preferably impermeable to other chemical species.

One method of forming a membrane 131 useful in the present invention is as follows:

1. Form a solution of synthetic polymer material in a solvent or mixed solvent system. The solution can be a mixture of two or more block copolymers, although it may contain one or more polymers and/or copolymers. The solution preferably contains 1 to 90% w/v synthetic polymer material, more preferably 2 to 70%, or yet more preferably 3 to 20% w/v. Seven % w/v is particularly preferred.
2. One or more polypeptides (typically with solubilizing detergent) are placed in solution, either separately or by being added to the existing polymer solution. Where the solvent used to solubilize the synthetic polymer materials is the same, or of similar characteristics and solubility to that which can solubilize the polypeptide, it is usually more convenient to add the polypeptide to the polymer solution directly. Otherwise, the two or more solutions containing the synthetic polymer materials and the polypeptide must be mixed, possibly with an additional cosolvent or solubilizer. Most often, the solvent used for the polypeptide is aqueous.

The amount of polypeptide used will vary with the type of polypeptide used, the nature and function of the membrane, the environment in which it will be used, etc. The amount of polypeptide may be important to certain applications such as fuel cells where, in general, the higher the concentration of polypeptide per square centimeter of surface area, the higher the rate of proton transfer per unit area (in terms of current). In general, however, as long as some polypeptide is present and functional, and as long as the amount of polypeptide used does not prevent membrane formation or render the membrane unstable, then any amount of polypeptide is possible. Generally, the amount of polypeptide will be at least about 1%, more preferably about 5%, even more preferably 10%, and still more preferably at least about 20% and most preferably 30% or more by weight based on the final weight of the membrane. The amount of polypeptide to solvent can be as low as 1 mg/ml. Preferably, the concentration is from about 5 mg/ml to about 50 mg/ml. More preferably the concentration is from about 10 mg/ml to about 30 mg/ml. Complex 1 is a preferred polypeptide.

Suitable solubilizing and/or stabilizing agents such as cosolvents, detergents and the like may also be needed, particularly in connection with the polypeptide solution. Solubilizing detergents are commonly found at the 0.1% to 1.0% concentration level, and more preferably up to about 0.5% is contemplated. Such detergents include ionic detergents: Sodium dodecyl sulfate, Sodium N-dodecyl sarcosinate, N-dodecyl Beta-D-glucopyranoside, Octyl-Beta-D-glucopyranoside, dodecyl-maltoside, decyl, undecyl, tetradecyl-maltoside (in general, an alkyl chain of about 8 carbons or more bonded to a sugar as a general form of an ionic detergent) octyl-beta-D-glucoside and polyoxytheylane (9) dodecyl-ether, $C_{12}E_9$, as well as non-ionic detergents, such as triton X-100, or Nonidet P-40. Also useful are certain polymers, typically diblock copolymers which exhibit surfactant properties, such as BASF's Pluronic series, or Disperplast (BYK-Chemie). Stabilizing agents may also include PEG, PEO and the like in amounts of up to about 1.0% concentration.

Mixing of these solutions is often a relatively simple matter and can be accomplished by hand or with automated mixing tools. Heating or cooling may also be useful in membrane formation depending on the solvents and polymers used. In general, rapidly evaporating solvents tend to form membranes better with cooling while extremely slowly evaporating solvents would most likely benefit from a slight degree of heating. One can examine the boiling point of solvents used to select those with the most favorable characteristics provided they are appropriate for the polymer used.

One must, of course, however consider also the need to incorporate the polypeptide into the solvent polymer mixture, which can be a nontrivial matter. It is possible, for example, to mix 5 microliters of a detergent solubilized complex 1 (0.15% w/v dodecyl maltoside) having 10 mg/ml of complex 1 into 95 microliters of a mixture of a 3.2% w/v polystyrene-polybutadiene-polystyrene triblock copolymer (a completely hydrophobic triblock Sold under the trademark STYROLUX 3G55, Lot No. 7453064P, available from BASF in a 50/50 mixture of acetone and hexane and to deposit same in a manner that will allow for membrane formation. In this case, the final mixture included about 5% v/v of water, 0.75% w/w complex 1 relative to the weight of the synthetic polymer material. Generally, the solutions are sufficiently stable at room temperature to be useful for at least about 30 minutes, provided that the solvents do not evaporate during that time. They also can be stored overnight, or longer, generally under refrigerated conditions.

3. A volume of the final solution including both the polypeptide(s) and the synthetic polymer materials is formed into a membrane and allowed to at least partially dry, thereby removing at least a portion of the solvent. It is possible to completely dry some of the membranes produced in accordance with the invention or to substantially dry same. By substantially dry it is meant that there may be some residual solvent, up to about 15%, which is often retained even if left out at room temperature for several hours. In one example, using the barrier 102 of FIG. 1, and aperatures 130 of 100 microns in diameter, 4 microliters of the solution may be added dropwise by pipet onto the aperatures so as to form membranes. Each 4 microliters of solution will produce membranes in about 200 aperatures with the resulting membranes 131 having a thickness of about 25 microns.

The above-described membrane is a biocompatible membrane and complex 1 is a polypeptide that can participate in a redox reaction to convert NADH to NAD+ while liberating both protons and electrons. But this particular membrane is also a PTM. PTMs include at least one layer of material, generally a synthetic polymeric material, which is preferably impermeable to liquids, solids and gases, and most importantly to the passage of protons driven by a differential in concentration or concentration gradient. At the very least, the majority of the flow of protons across the PTM, as measured by the flow current, will be the result of something other than proton permeability. Yet, PTMs are not dielectric (unable to carry current and/or permit flow of protons). Without wishing to be bound by any particular theory of operation, it is believed that PTMs will allow protons to pass based on charge differential rather than a concentration effect. More specifically, protons interact with the cationic $\pi$ bonds of certain groups found in specifically selected polymeric materials used to construct the PTM and are driven into and across the PTM by excess positive charge on one side of the PTM. Generally speaking, however, as long as the membrane is both "relatively proton impermeable," meaning the majority of the flow of protons across the PTM, as measured by the flow of current, is a result of something other than proton permeability (preferably but not necessarily proton-tunneling) and nondielectric, it can be considered a PTM.

Quantum mechanics provides a theoretical foundation for such membranes. Unlike other ions, which have both a nucleus and electrons, protons are fundamental particles. They exhibit quantum mechanical behavior. While this quantum mechanical behavior is weaker than that of electrons, it is greater than that of other ions. This is in part due to their size, which also lies between that of an electron and that of other ions. Protons thus may be trapped in a quantum well or may tunnel through a quantum well when enough energy is available. It is expected that the kinetic energy of a proton does not have to be larger than the quantum well for tunneling to occur, but that the tunneling probability increases with increasing kinetic energy of the proton and/or the shallowness of the proton well. PTMs may be associated with polypeptides, as is the case in the above example, or may be used in conjunction with a biocompatible membrane. Thus, in this case, it would be appropriate to designate membranes 131 either or both a biocompatible membrane or a PTM.

The membrane used may alternatively be a PEM. These membranes are permeable to protons, which are driven across the membrane from the anode to the cathode primarily by a concentration gradient that is established by the chemistries of the anode and cathode compartments. PEMs are well known to those of ordinary skill in the area of fuel cells.

Although any of a biocompatible membrane, PTM or PEM (or indeed, any other suitable membrane) may be used as a membrane, biocompatible membranes or PTMs are preferred. Also, if the membrane does not include a polypeptide able to cleave protons and electrons from electron carriers, such a polypeptide must be provided in the anode compartment 107.

In an embodiment of the present invention, PCCs are associated with a membrane. In another embodiment, PCCs are free-floating within the anode compartment 107. In yet another embodiment, PCCs are immobilized onto the anode electrode with the electron carrier. In another embodiment, PCCs are placed within the anode compartment (including on the anode) while a PTM or the like transports the proton generated by the PCCs. In other embodiments, combinations of these PCC strategies are used.

Anodes and cathodes can be made of any electrically conductive material, which is otherwise generally unreactive with the elements of the photon sensor. The anode 105 and cathode 106 are preferably made of metals or carbon. The size and shape of the anode 105 and cathode 106 can be made to fit the necessary dimensions of the photon sensor 100, allow for passage of various chemical species, and are placed so as to minimize the blockage of incoming photons on the biomembrane.

The sensor 100 is encased by walls 103', which may prevent the passage of light. At least one wall 103 of the anode compartment must include at least a portion that allows the passage of at least some light into the anode compartment 107. Although the sensor is depicted throughout as having a rectangular box shape, this is not required to practice the invention. As such, any shape allowing for the photon sensor to function in the manner described is suitable.

In general operation, an incoming light source 104, being a stream of one or more photons, enters the anode compartment 107 through a wall 103 or portion thereof. The light strikes a PCC, either associated with a membrane 131 or free floating in the anode compartment 107. In either instance, the PCC becomes excited. The PCC then gives up at least one electron and at least one proton to an electron carrier disposed in the anode compartment 107. The electron carrier is analogous to the proton acceptor referred to in Molecular Cell Biology, 4$^{th}$ Edition, H. Lodish, A. Berk, S. L. Zipursky, P. Matsudaira, D. Baltimore and J. Darnell, W. H. Freeman and Company, pages 648–655. Then the electron carrier passes the electron along, ultimately to the anode 105. This transfer may be direct, through other electron carriers, transfer mediators or combinations.

Figure 2:
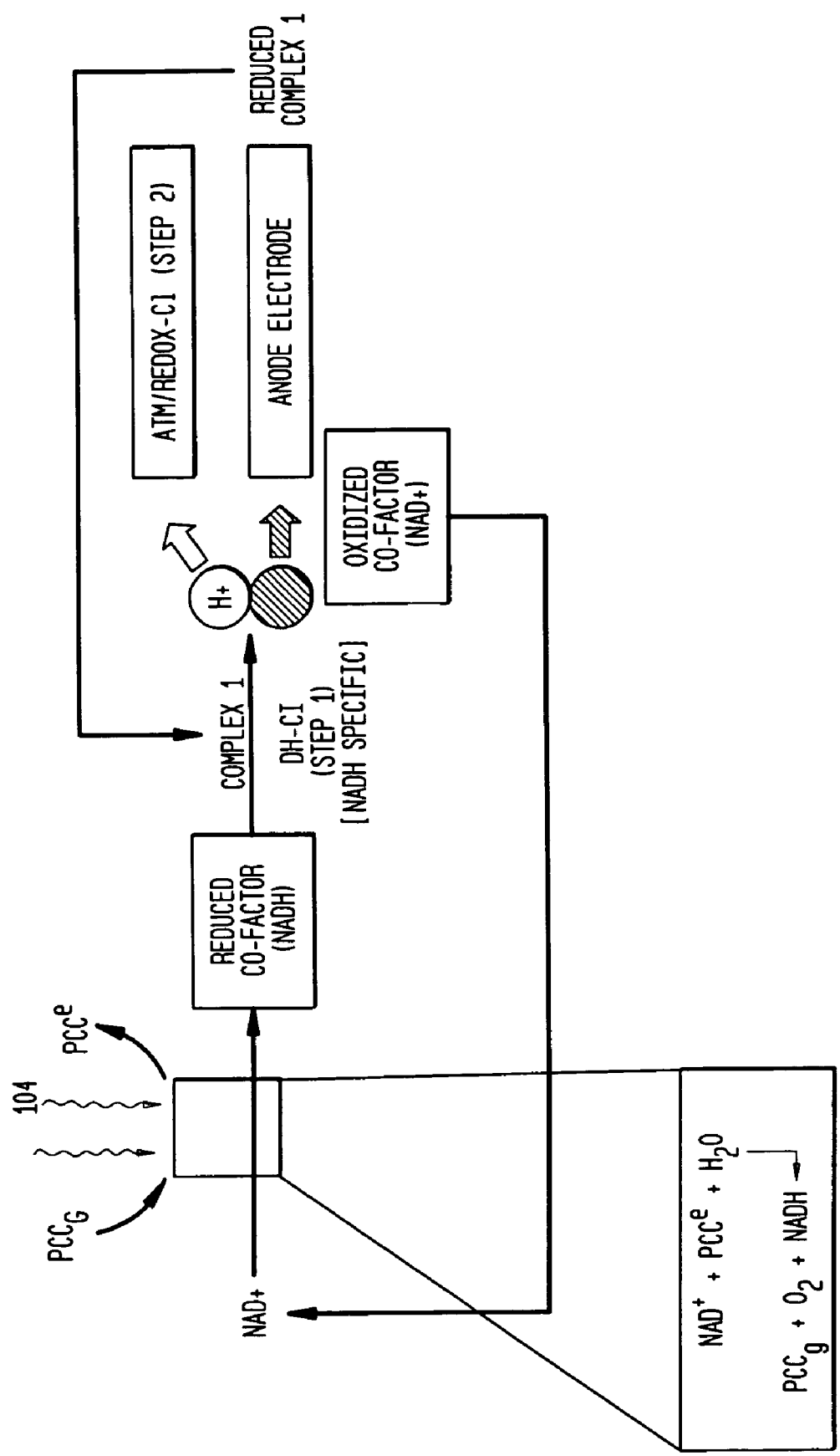
FIG. 2 is a schematic representation of the transfer of electrons and protons in an anode compartment of a light sensor or imager in an embodiment of the present invention.

More specifically, once the PCC is energized by light, represented in FIG. 2 as PCCe, it reacts with an oxidized form of an electron carrier, NAD+ in FIG. 2, also identified therein as an oxidized cofactor, and with a source or donor of protons and electrons. The result is that the light's energy is translated into chemical energy by the passage of protons and electrons from water, in the aqueous environment of the anode compartment 107 to the electron carrier to form in this illustration NADH or the reduced form of the cofactor. The PCC has lost the energy it absorbed, as well as the protons and/or electrons. This form of PCC is indicated in FIG. 2 as PCCg. As a result of the reaction, water has been converted into both energy and oxygen.

Next, either directly or through other electron carriers or transfer mediators, the electrons and protons reach some species that can allow them to interact with the anode 105 and cathode 106. As illustrated in FIG. 2, that species can be the polypeptide complex 1, shown in the figure as DH-C1. This particular polypeptide is NADH specific and can participate in a redox reaction which can convert NADH to NAD+ releasing both protons and electrons. The complex 1 is associated with a membrane and can participate in the transfer of the proton into and/or across the membrane. The electron is generally picked up by a transfer mediator which, either directly or through a series of transfers to other such molecules, transfers the electron to the anode 105. The oxidized NAD+, also called an oxidized cofactor in FIG. 2, is then available to interact with PCCe again and the cycle can continue. The process is much like that described in the attached document entitled BIOCOMPATIBLE MEMBRANES AND FUEL CELLS PRODUCED THEREWITH, however, instead of fuels and soluble enzymes, water, light and PCCs are used. This assumes that the polypeptide is associated with the membrane 131 and participates in the transfer of protons across the membrane. If the membrane was a PTM, the associated polypeptides could have the same function. However, at least some portion of the protons would be transferred by proton-tunneling.

Without being bound by particular theories of proton transfer, protons may be transferred across the membrane 131 by one or several methods. For example, if the mem brane is a PTM, proton tunneling as described above accounts for at least a portion of the protons so transferred. Using a biocompatible membrane, it is believed the protons are pumped across the membrane by enzymatic polypeptides. Using a conventional PEM, protons are believed to diffuse across the membrane largely from high proton concentrations on the anode side of the membrane to a relatively lower proton concentration on the cathode side of the membrane. It is possible in a single membrane that all these methods of transfer or any combination of methods are employed.

The electron passes from the anode 105 through a measuring circuit 109, to the cathode 106, where it is available for a reaction involving a proton such as that which passed from the anode compartment 107.

PCCs, as defined herein, are compounds that may be associated with a membrane and/or may be free floating, and also can react with light and participate in transferring energy to the system and/or transporting protons across the membrane. The protons and electrons are transferred by the action of the PCC and an electron carrier as previously noted. Electron carriers can include, without limitation, reduced nicotinamide adenine dinucleotide (denoted NADH; oxidized form denoted NAD or NAD+), reduced nicotinamide adenine dinucleotide phosphate (denoted NADPH; oxidized form denoted NADP or NADP+), reduced nicotinamide mononucleotide (NMNH; oxidized form NMN), reduced flavin adenine dinucleotide (FADH$_2$; oxidized form FAD), reduced flavin mononucleotide (FMNH$_2$; oxidized form FMN), reduced coenzyme A, and the like. Electron carriers include proteins with incorporated electron-donating prosthetic groups, such as coenzyme A, protoporphyrin IX, vitamin B12, and the like. All of the above are believed to carry both the electrons and protons that can be generated by the action of the soluble enzymes on the fuel. However, not all electron carriers will convey protons. Also within the definition of electron carrier are electron transfer mediators, as specified below.

An electron transfer mediator is a composition which facilitates transfer of electrons released from an electron carrier to another molecule, typically an electrode or another electron transfer mediator with an equal or lower reduction potential. Examples, in addition to those previously identified, include phenazine methosulfate (PMS), pyrroloquinoline quinone (PQQ, also called methoxatin), Hydroquinone, methoxyphenol, ethoxyphenol, or other typical quinone molecules, methyl viologen, 1,1'-dibenzyl-4,4'-dipyridinium dichloride (benzyl viologen), N,N,N',N'-tetramethylphenylenediamine (TMPD) and dicyclopentadienyliron (C10H10Fe, ferrocene).

As illustrated in FIG. 2, the electron carrier (for example, NADH having received at least one electron from a PCC and at least one proton from the aqueous medium) can next interact with the polypeptides associated with a membrane or free floating. For example, as also shown in FIG. 2, it can interact with the dehydrogenase function of Complex 1 embedded in a biocompatible membrane. The Complex 1 liberates protons from the NADH molecule, as well as electrons. The electrons might flow directly to the anode. However, more often, they are taken up by a transfer mediator, which then transports the electrons to the anode.

NADH dehydrogenase Complex 1 is an interesting polypeptide in that it also can participate in transporting protons across the biocompatible membrane. What is particularly interesting, however, is that the protons transferred are not necessarily the protons liberated by the action of the dehydrogenase portion of Complex 1. Therefore, to be most successful, a photon sensor in accordance with this particular aspect of the invention will contain additional proton species in the anode compartment 7. Furthermore, it is possible that Complex 1 will not transport protons, even if they are present, unless and until the dehydrogenase function of the Complex 1 has acted upon NADH to liberate its protons and electrons.

When the transfer mediator gives up its electrons to the anode, it is again capable of obtaining additional electrons liberated by oxidizing other electron carriers. NAD+ is also now again ready to receive protons and electrons under the influence of PCC. The reactions just described generally occur at the anode electrode 105 and in the anode compartment 107 and can be exemplified chemically as follows.

$$H_2O + NADH \rightleftharpoons NAD^+ + H_3O^+ + 2e^- \quad (4)$$

The corresponding reaction at the cathode 106 in the cathode compartment 108 can be any reaction that consumes the produced electrons with a useful redox potential. Using oxygen, for example, the reaction can be:

$$2H_3O^+ + 1/2\, O_2 + 2e^- \rightleftharpoons 3H_2O \quad (5)$$

Using reaction 5, the catholyte solution (an electrolyte used in the cathode compartment) can be buffered to account for the consumption of hydrogen ions, or more preferably, the membrane 131 between the anode and cathode compartments 107, 108 is sufficiently effective to deliver the neutralizing hydrogen ions (hydrogen ion or proton).

In one embodiment, the corresponding reaction at the cathode 106 is:

$$H_2O_2 + 2H^+ + 2e^- \rightleftharpoons 2H_2O \quad (5)$$

The cathode reactions result in a net production of water, which, if significant, can be dealt with by, for example, providing for space for overflow liquid, or providing for vapor-phase exhaust. A number of electron acceptor molecules are often solids at operating temperatures or solutes in a carrier liquid, in which case the cathode compartment 108 should be adapted to carry such non-gaseous material.

Where, as possibly the case with hydrogen peroxide as the electron acceptor molecule, the electron acceptor molecule can damage the polypeptides of the membrane 131 and any other species in the anode compartment 107. In that instance, a scavenger for such electron acceptor molecules can be used in the photon sensor to prevent peroxide or damaging electron acceptor molecules from entering the anode compartment. Such a scavenger can be, for example, the enzyme catalase ($2H_2O_2 \rightarrow 2H_2O+O_2$), especially where conditions at the anode electrode are not effective to catalyze electron transfer to $O_2$. Alternatively, the scavenger can be any noble metal, such as gold or platinum. Such a scavenger, if an enzyme, can be covalently linked to a solid support material. Alternatively, a barrier between the anode compartment and the cathode compartment is provided and has at most limited permeability to hydrogen peroxide.

Figure 3A:
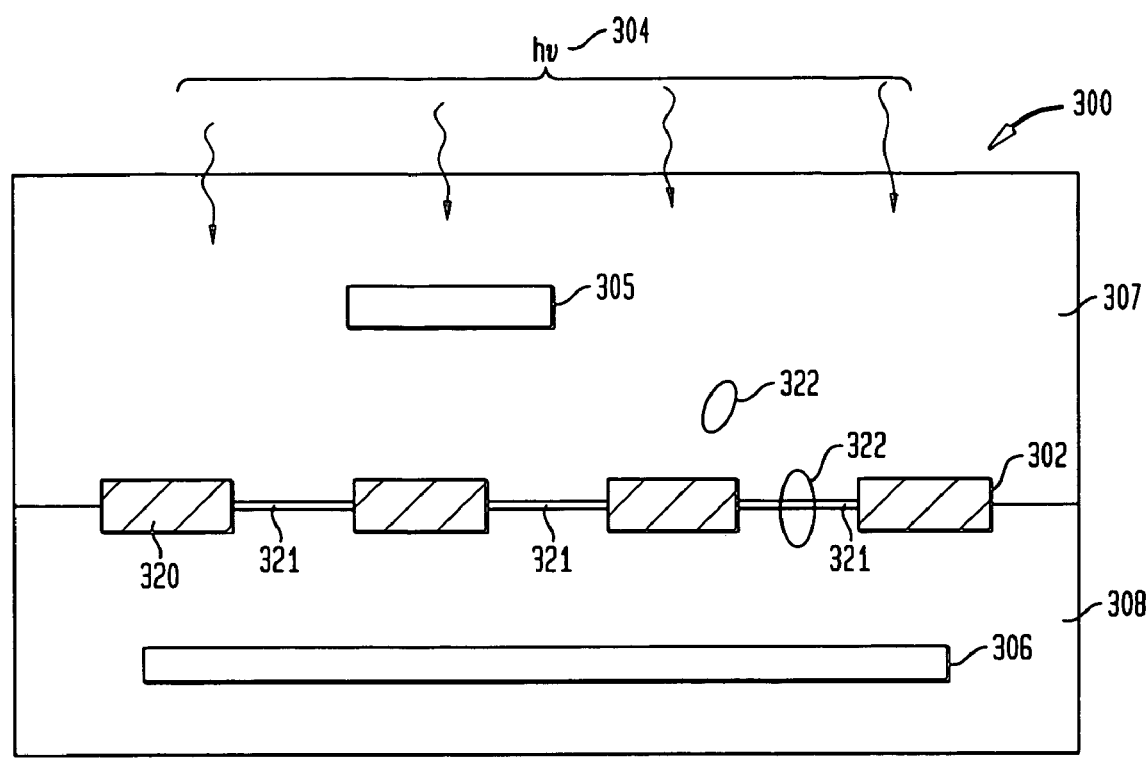
FIG. 3A is a close up schematic of a photon sensor according to an embodiment of the invention.

FIG. 3A is a close up schematic of portion of a photon sensor according to a preferred embodiment. A barrier 302 separates the anode compartment 307 from the cathode compartment 308. It is optimally composed of a dielectric material having pores or apertures 320, which pores or apertures are filled with a membrane 321. The membrane 321 includes an associated PCC 322. In alternative embodiments the PCC can be free-floating in the anode compartment 307 or both free floating and associated with the membrane 321. A cathode electrode 306 and an anode electrode 305 are also pictured. The anode electrode 305 is drawn here smaller than the cathode electrode 306, and strategically positioned to minimize interference with the light 304 entering the sensor cell 300.

In alternative preferred embodiments the anode electrode 305 may be placed in contact with or close proximity to the barrier 302. This may be accomplished by several methods, including using a plating or sputtering process to adhere the anode material to the dielectric 320, or even by using a photographic etching process. Coating methods which can be used to form electrodes on a dielectric 320 include a first coating or lamination of the dielectric 320, followed by plating, sputtering or using another coating procedure to coat with titanium or a noble conductor such as gold or platinum. Another method is directly sputtering an attachment layer, such as chromium or titanium onto the dielectric 320, followed by plating, sputtering or other coating procedure to attach a noble conductor.

The anode electrode 305 can be coated with an electron transfer mediator such as an organometallic compound which functions as a substitute electron recipient for the biological substrate of the redox enzyme. Coating of the transfer mediator can be achieved by hydrogel incorporation, covalent binding or attachment, and encapsulation of polymer that is permeable to the chemical substrate of the enzyme. Similarly, the membrane 321 of the embodiment or structures adjacent to the membrane 321 can incorporate such electron transfer mediators, or the electron transfer mediator can be more generally available in the anode chamber. Such organometallic compounds can include, without limitation, dicyclopentadienyliron ($C_{10}H_{10}Fe$, ferrocene, available along with analogs that can be substituted, from Aldrich, Milwaukee, Wis.), platinum on carbon, and palladium on carbon. Further examples include ferredoxin molecules of appropriate oxidation/reduction potential, such as the ferredoxin formed of rubredoxin and other ferredoxins available from Sigma Chemical. Other electron transfer mediators include organic compounds such as quinone and related compounds. Still further electron transfer mediators are methylviologen, ethylviologen or benzylviologen (CAS 1102-19-8; 1,1'-bis(phenylmethyl)-4,4'-bipyridinium, N,N'-γ,γ'-dipyridylium), and any listed below in the definition of electron transfer mediator.

In operation, the incoming light 304 strikes PCCs 322, which becomes excited and commences the chain of chemical events described above, ultimately resulting in an electron passing through anode 305, through an associated external measuring circuit (not depicted), then on to cathode 306.

Figure 3B:
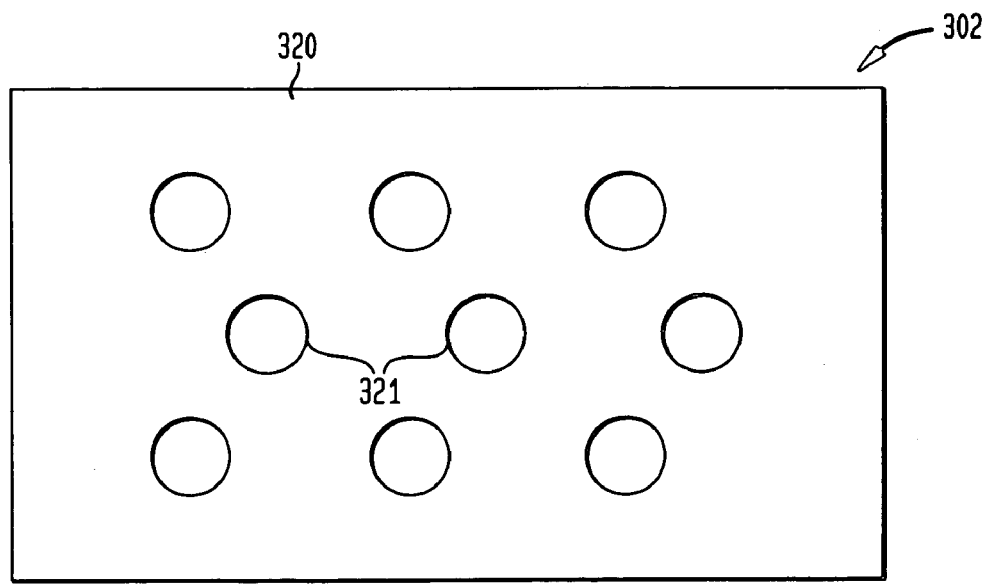
FIG. 3B shows an exemplary barrier B1 with pores filled with a biomembrane BM1 in accordance with an embodiment of the invention.

FIG. 3B shows an exemplary barrier 302 with aperatures 320 filled with a membrane 321. The preferred incorporated polypeptides are not depicted. If the PCCs of such an embodiment are incorporated with the membrane 321, it is expected that at low photon densities, the quantum efficiency of the sensor will be proportional to the percentage of barrier B1 area covered by the membrane 321 when no optics are added to focus light onto the membrane.

FIGS. 4A, 4B, 4C and 4D depict various exemplary barriers and membranes in accordance with embodiments of the invention. Placement of the anode electrode(s) 405 varies among these examples.

Figure 4C:
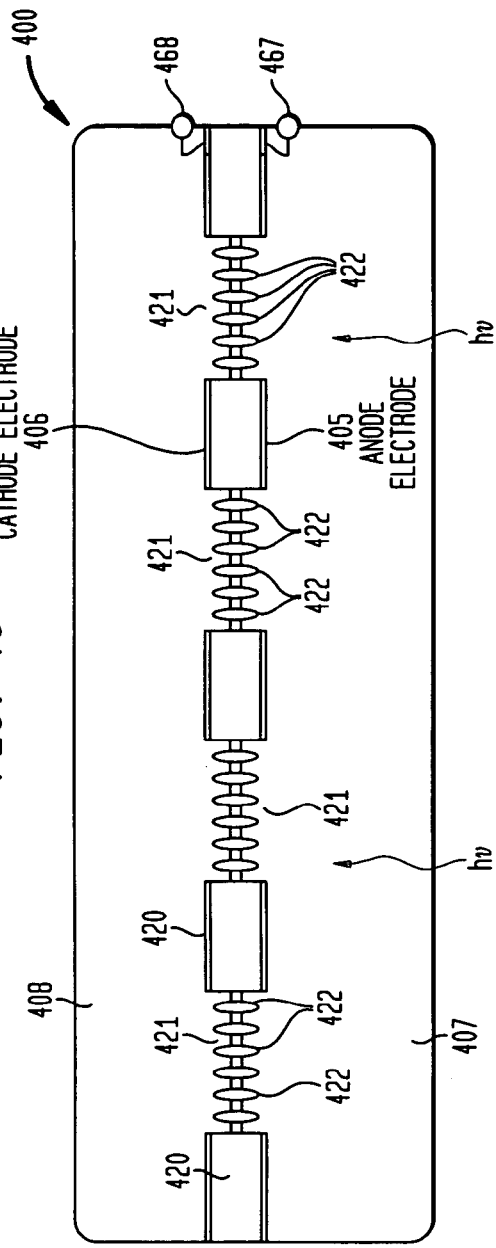
FIG. 4C depicts an exemplary barrier and membrane in accordance with an embodiments of the invention.

A barrier 402 separates the anode compartment 407 from the cathode compartment 408. It is optimally composed of a dielectric material having pores or apertures 420, which pores or apertures are filled with a membrane 421. The membrane 421 includes associated PCCs 422. In alternative embodiments the PCC can be free-floating in the anode compartment 407 or both free floating and associated with the membrane 421. A cathode electrode 406 and an anode electrode 405 are also pictured. The anode electrode 405 and cathode electrode 406 may be plated or proximate to the dielectric material 420 of the barrier 402, as depicted in FIGS. 4A and 4C, or they may be positioned at some distance from the barrier 402, depicted as anode electrode 405' and cathode electrode 406' of FIG. 4D. When the anode electrode 405' is some distance from the barrier 402, the anode electrode 405' is preferably positioned to not block light hu entering the sensor cell from arriving at the pores or aperatures 420.

FIG. 4B shows the wall 403' and a wall portion 403 with an area allowing light to enter an exemplary sensor 400". It also depicts an anode contact 467 and a cathode contact 468. These contacts are drawn for exemplary purposes only, and may be replaced with other electrical components.

Figure 4D:
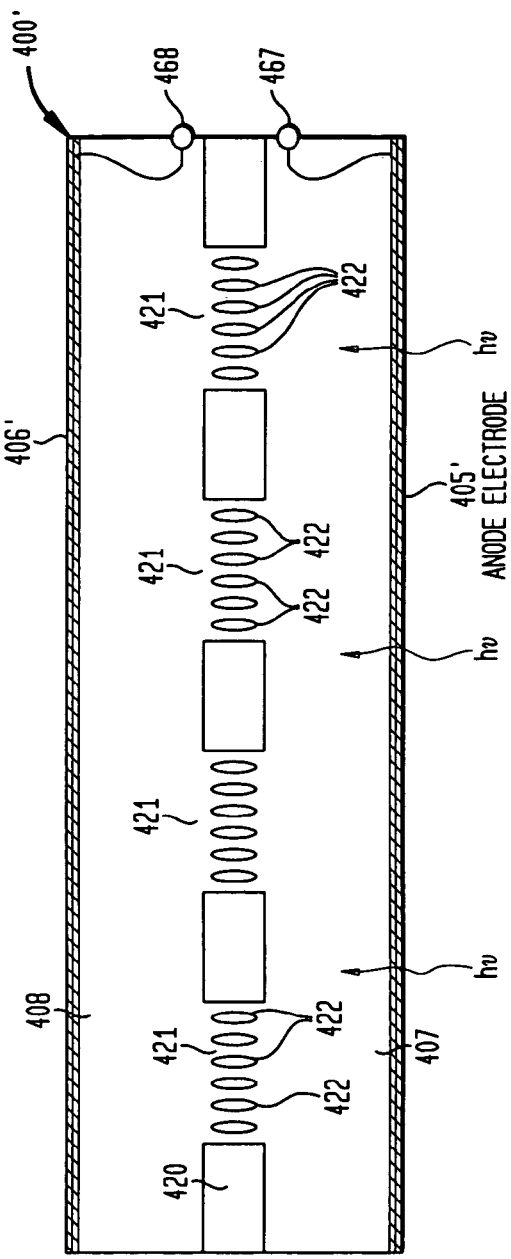
FIG. 4D depicts an exemplary barrier and membrane in accordance with an embodiments of the invention.

FIGS. 4C and 4D depict exemplary alternative placement strategies for the anode electrodes 405, 405' and cathode electrodes 406, 406'. In FIG. 4C, the anode electrode 405 and cathode electrode 406 are plated to or otherwise in intimate association with the anode and cathode side of the dielectric 420 composing the barrier, respectively. This placement strategy advantageously decreases the conductive path between the anode and cathode electrodes.

In FIG. 4D, the anode electrode 405' and cathode electrode 406' are separate from the dielectric 420 composing the barrier. This placement strategy allows increased transmembrane potential and decreased current leakage. Any combination of anode and cathode placement may be used in a preferred embodiment of the invention.

Figure 5A:
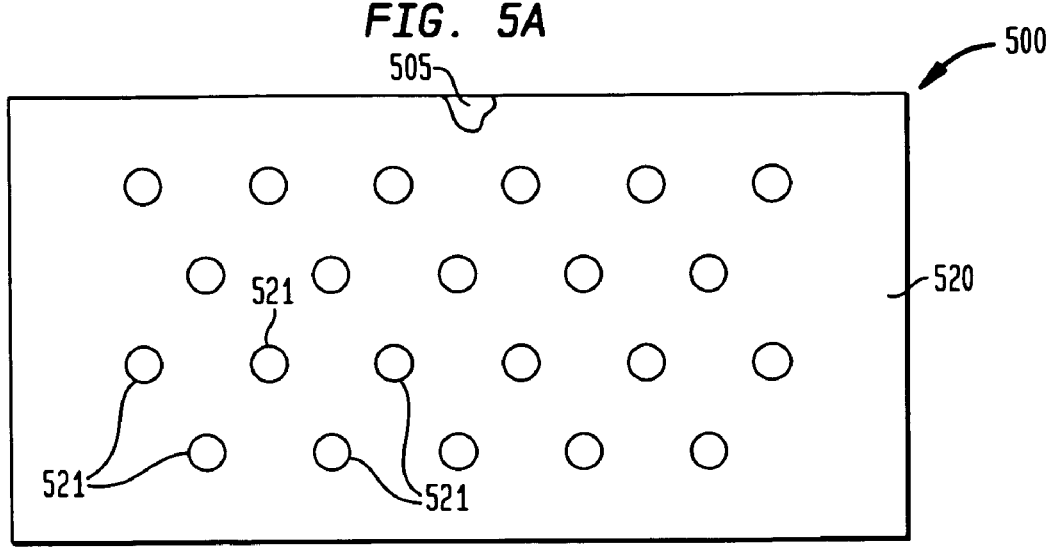
FIG. 5A depicts an exemplary barrier and anode according to an embodiment of the present invention.
Figure 5B:
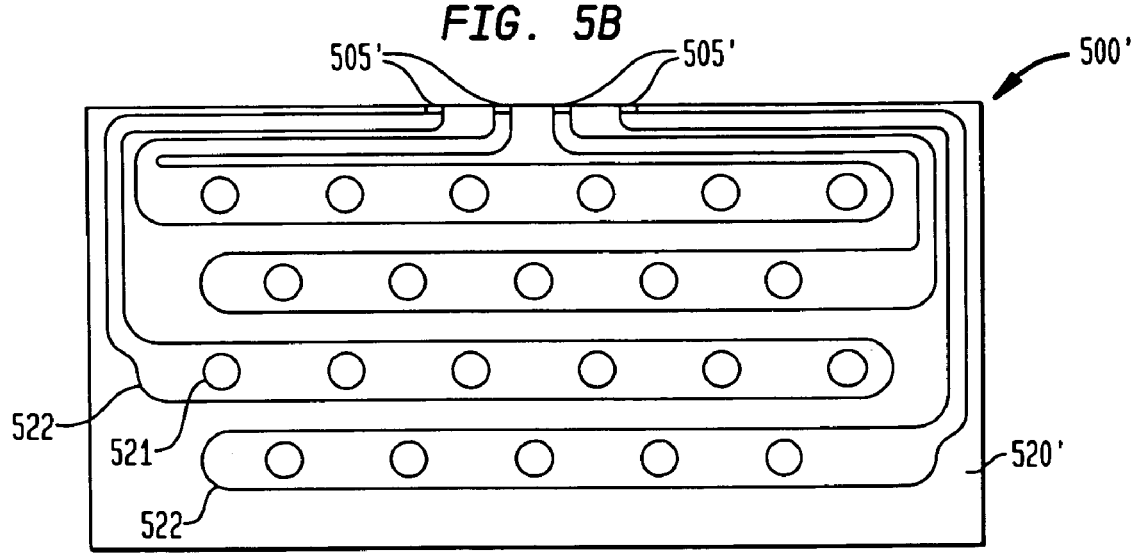
FIG. 5B depicts an exemplary barrier with anode trace paths according to an embodiment of the present invention.
Figure 5C:
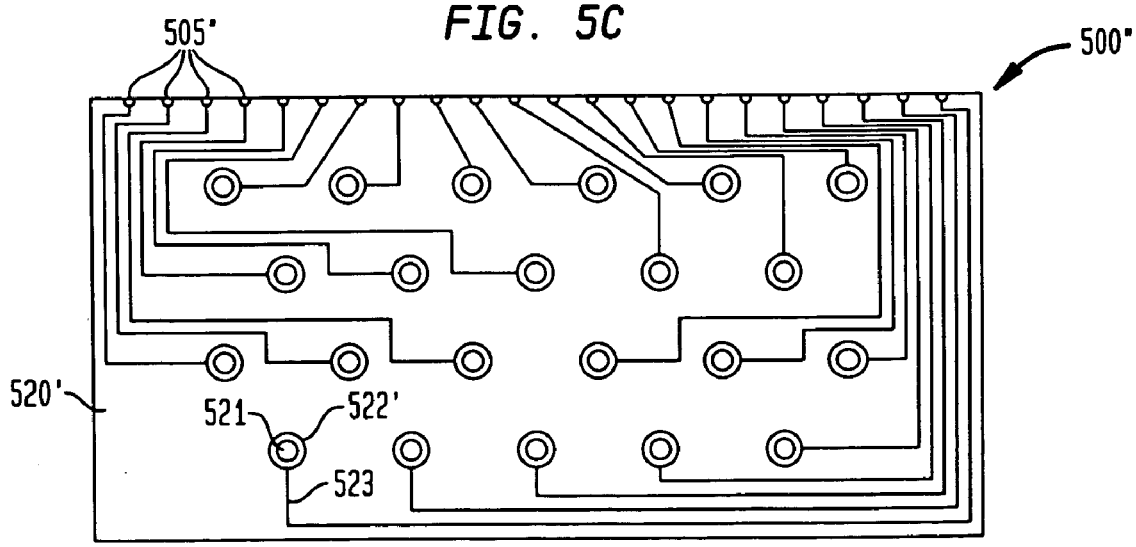
FIG. 5C depicts an exemplary barrier with anode trace paths according to an embodiment of the present invention.

FIGS. 5A, 5B and 5C depict optional anode designs and related structures according to embodiments of the invention and related structures. For exemplary purposes, these figures show a limited number and density of membranes 521 and related structures. It is understood that in preferred embodiments the density and number of the membranes 521 and related structures is greater.

FIG. 5A shows an exemplary barrier 500 with apertures filled with a membrane 521. The preferred incorporated polypeptides are not depicted. In this embodiment, the anode is placed in intimate contact with the dielectric of the barrier 500, such as application of a thin coating or plating of anode material 520 to the barrier 500 would leave. The membranes 521 are not similarly coated or plated by the anode material 520. Here, the anode material 520 itself forms a single sheet with the membranes 521 occupying 'holes' in the single sheet, so that the overall effect is for the single sheet of anode material 520 to resemble a slice of swiss cheese.

Since the anode material 520 conducts electrons, all points on such a single sheet of anode material 520 are at equivalent electrical potential. In operation, a light sensor incorporating the barrier 500 generates electrons, either at the membranes 521 or in other areas of the anode compartment (not depicted). These electrons then migrate to the anode material 520, where they are conducted to in interface location, such as the exemplary interface location 505 on the anode material 520. The interface location 505 is a location wherein a lead or connector for electrical connection of the anode material with a current measuring or other electrical device and ultimately with the cathode electrode (not pictured) can be made. The interface location 505 does not need to be of different material composition from the anode material 520.

As previously mentioned, the anode material 520 may preferably be a conductive material plated or sputtered onto the dielectric of the barrier 500. Alternatively, traces may be formed on the dielectric material of the barrier 500 using selective plating and etching techniques as is well known to those of ordinary skill. Such etches resemble those of printed circuit boards or integrated circuits, allowing the anode to be composed of numerous anodes connected by traces with one or more interface locations, as further depicted in FIGS. 5B and 5C.

FIG. 5B depicts one embodiment of a barrier 500' including multiple anode traces 522 selectively plated, sputtered or otherwise etched onto the dielectric material 520' of the barrier 500'. In this embodiment, horizontal rows of anode traces 522 each tie together one row of membranes 521. In such an embodiment it is important to isolate the electrons generated at individual or groups of membranes 521. It is preferable that the PCCs of such an embodiment are incorporated with the membranes 521 and not be free floating. This is because it is desirable to localize the acquisition of the generated electron by an anode trace 522 positionally with the proximity of its generation. If the electron is generated in the three dimensional volume of the anode compartment (not depicted) by free floating PCCs, there is a much higher probability that the electron will be acquired by an anode trace 522 other than that nearest it. If, alternatively, the electron is generated at an aperture/membrane 521, the electron must cross the planar surrounding anode trace 522, to which it is electrically drawn by action of the anode-cathode potential, in order to be acquired by an anode trace other than that nearest its point of generation.

The barrier 500' and anode traces 522 of FIG. 5B are optimized to be preferably used whenever detection of photons in a banded pattern is desired. This banded pattern may be horizontal or vertically oriented, or of any intermediate orientation.

Examples of an application using horizontally oriented banded anode traces are given in FIGS. 8C and 8D, described in detail below. In these detectors, light is first split into component spectral sub-bands or colors using either a prism (FIG. 8C) or a diffraction grating (8D). A barrier such as that in FIG. 5B is then used to generate electrons and collect them in the banded anode traces. As indicated in FIG. 5B, the anode traces 522 each lead to a separate interface area 505'. Separate electrical leads may then each connect to the separate interface areas 505', from where the individual currents from each anode trace 522 can be measured. In a detector such as those of FIG. 8C or 8D the intensity of light of each spectral sub-band can then be determined.

FIG. 5C applies a similar concept to a preferred embodiment of a light detector or imager that detects light at each individual aperture/membrane 521. The barrier 500" includes an anode trace 523 for each aperture/membrane 521, which connects an anode skirt 522' surrounding each aperture/membrane 521 and composed of anode material to numerous interface areas 505". Similarly and for the same reasons as with the banded anode traces of FIG. 5B, it is preferable that the PCCs of such an embodiment are incorporated with the membranes 521 and not be free floating.

Figure 7:
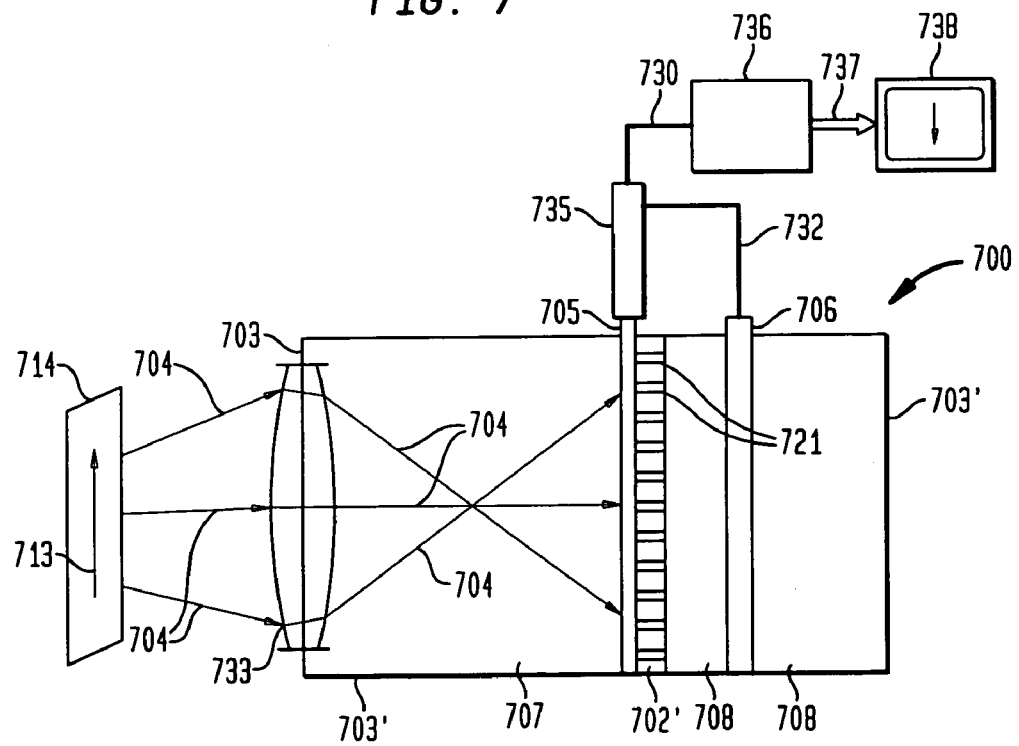
FIG. 7 depicts an exemplary photon sensor for sensing images in accordance with an embodiment of the present invention.

The light imager of FIG. 7 preferably includes a barrier 500" such as depicted in FIG. 5C. Light impacts the membranes 521, where electrons are generated. The electrons then migrate to an anode trace 523, most likely via the anode skirt 522' surrounding the aperture/membrane 521 where the electron was generated. The electron is further conducted along the anode trace 523 to the corresponding interface area 505", from where it can be counted by other electrical circuitry and be conducted to the cathode. By measuring the electrons from each aperture/membrane 521 in such a manner, a two dimensional image can be constructed of the incoming photons.

Figure 9:
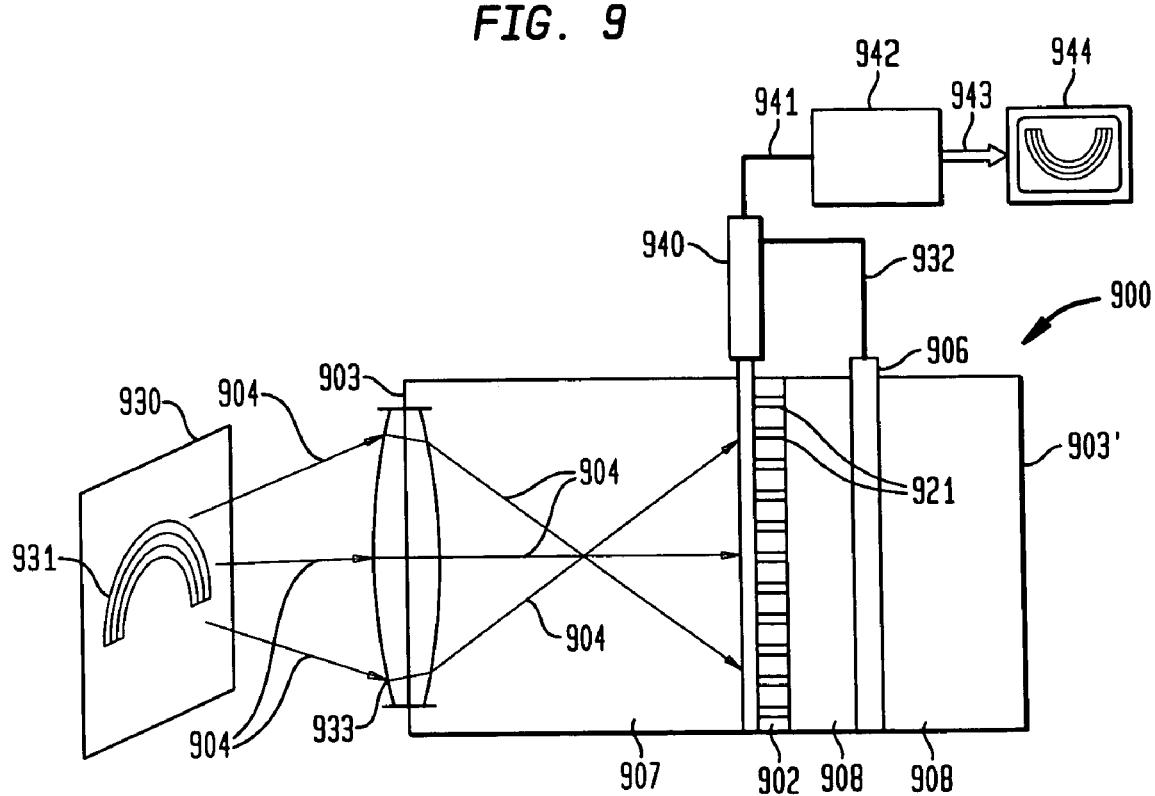
FIG. 9 depicts a color imager in accordance with an embodiment of the present invention.

The color light imager of FIG. 9 likewise preferably uses a barrier like that of FIG. 5C. In order to discern between the colors, each aperture/membrane 521 preferably includes a filter to selectively allow certain colors of light to reach the membrane, or each membrane uses a PCC that generates electrons only in response to particular colors, or some combination of both. In a barrier 500" with an array of such membranes 521, alternating between various color sensitive membranes 521 in known patterns allows the capture of colored images. Thus, alternating red, green, blue, red, green, blue, . . . and so on, the external electrical circuitry can analyze the electrons detected at each aperture/membrane 521 and reconstruct a colored image, which may then be displayed on a display device.

One problem with imaging devices using the banded and individual anode traces is that all membranes are not necessarily equal. For example, one membrane might incorporate a large quantity of PCC while another has only a smaller quantity. Thus, an equal number of photons striking each membrane might lead to generation and detection of a large number of electrons in the former membrane and a smaller number in the later membrane. Such nonhomogenity is expected although not preferred, and can be largely corrected by the preferential use of known test pattern images in conjunction with external computing devices and normalization algorithms. Using such algorithms, a computing device can increase the number of electrons detected at some membranes, decrease number of electrons detected at other membranes, or various combinations of increases and decreases, thereby 'normalizing' the observed results from the each membrane. Normalization techniques are well known to those of ordinary skill in the art.

Figure 6:
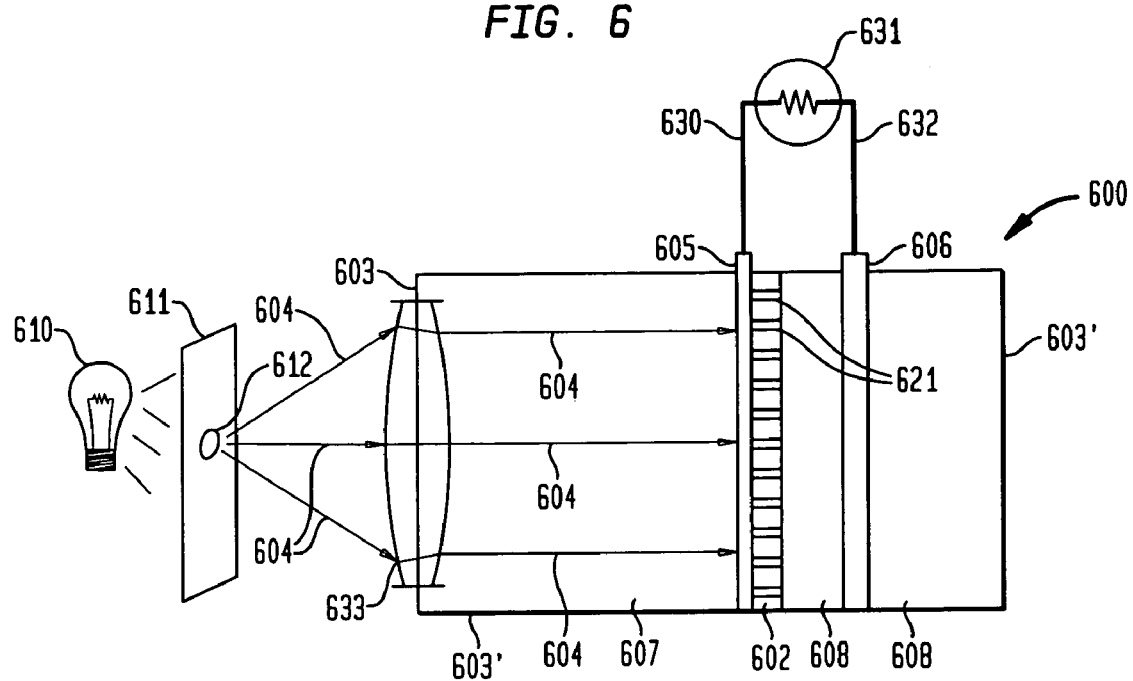
FIG. 6 shows a functional schematic diagram of an exemplary photon sensor of an embodiment of the present invention.

FIG. 6 shows a functional schematic diagram of an exemplary photon sensor of an embodiment of the present invention. In this example, a point source of light 604 is provided by a light source 610 in combination with a screen 611 with a hole 612. A point source is not required and is used herein for exemplary purposes. The photon sensor device 600 includes an encasement 603' having at least one wall 603 with an opening into which a lens arrangement 633 is mounted, thereby completing and closing the open wall 603. The lens arrangement 633 may include but is not limited to any single lens, such as a convex or concave lens, or any combination of lenses. It also includes any clear substance allowing any light to pass through, and may also comprise a light filter, diffraction grating, or prism depending upon the need of the application for which the photon sensor device 600 is used. The encasement 603', wall with opening 603, and lens arrangement together enclose a space. This space is divided by a barrier 602, to form an anode compartment 607 and a cathode compartment 608.

The barrier 602 includes a porous dielectric superstructure 620, the pores of which are filled with membranes 621. The barrier 602 also includes plated or etched to the anode compartment-facing surface, electrically isolated from the cathode compartment, an anode 605. The anode 605 is positioned to occupy only the part of the surface of the barrier 602 in between the aperatures filled with membranes 621.

The cathode compartment 608 includes a cathode 606. An electronic lead 630 connects the anode electrode 605 with a current measuring device 631, with another electrical lead 632 connecting the current measuring device 631 to the cathode 606. The anode compartment 607 and cathode compartment 608 are filled with their respective chemistries, as described above.

In operation, light 604 from light source 610 passes through the lens arrangement 633 and the anode compartment 607, towards the barrier 602 and the membranes 621 within the pores. The photons comprising the light 604 strikes PCCs, which then initiate the chemical steps resulting in electrons migrating to the anode 605 and protons passing through the membrane 621. Electrical current thus passes from the anode 605 through the electronic lead 630, through the current measuring device 631, through the other electronic lead 632 into the cathode 606, where it is available for cathode compartment reactions.

The current at the measuring device 631, is the count of electrons passing through this path, and therefore is related proportionally to the number of photons that have interacted with the PCCs. Current measuring devices are well known to those of ordinary skill in the art, and include circuitry and other details not depicted in the various Figures used as examples herein.

FIG. 7 depicts a functional schematic diagram of an exemplary imaging device 700 of an embodiment of the present invention. In this example, a screen or sheet 714 upon which an image 713 is disposed is lighted sufficiently by a light source (not shown) for light 704 from the image 713 to pass to the photon imaging device 700. The photon imaging device 700 includes an encasement 703' having at least one wall 703 with an opening into which a lens arrangement 733 is mounted, thereby completing and closing the open wall 703. The lens arrangement 733 may include but is not limited to any single lens, such as a convex or concave lens, or any combination of lenses. It also includes any clear substance allowing any light to pass through, and may also comprise a light filter, depending upon the need of the application for which the imaging device 700 is used. The diagram shows the lens arrangement 733 as inverting the image 713 by focusing causing the light 704 to cross in the anode compartment 707. It is not necessary for the lens arrangement 733 to invert the image 713, and alternative embodiments may or may not do so. The encasement 703', wall with opening 703, and lens arrangement together enclose a space. This space is divided by a barrier 702', forming an anode compartment 707, and a cathode compartment 708.

The barrier 702' includes a porous dielectric superstructure, the pores of which are filled with membranes 721, preferably including PCCs. The barrier 702' also includes plated or etched to the anode compartment-facing surface, electrically isolated from the cathode compartment, an anode 705. The anode 705 is arranged differently from the anode 605 of photon sensor 600 of FIG. 6.

The anode 705 of the photon imaging device 700 is preferably in intimate proximity to the barrier 702'. Moreover, the anode 705 is preferably disposed as an array of anode traces (not shown), each isolating a particular membrane 721, preferably one anode trace per membrane pore.

The anode traces comprising the anode 705 are advantageously drawn together and integrated at the anode trace integration unit 735.

The anode trace integration unit 735 is an electronic device, which receives as input the various anode traces. Electrons arriving from each anode trace are counted by the anode trace integration unit 735, which then forwards the information to a display controller 736 over a signaling line 730. The display controller 736 is preferably a computer that creates an image based on the information received from the trace integration unit 735 and produces an image that is communicated 737 to a display device 738, over another signaling line 737. Instrument assemblies such as the trace integration unit 735, display controller 736, display device 738, and communication signaling lines 730, 737 are well known to those of ordinary skill in the art.

The cathode compartment 708 includes a cathode 706. An electrical lead 732 connects the trace integration unit 735 to the cathode 706. The anode compartment 707 and cathode compartment 708 are filled with their respective chemistries, as described above.

In operation, light 704 from the image 713 passes through the lens arrangement 733 and the anode compartment 707, towards the barrier 702' and the membranes 721 within the pores. In a preferred embodiment, a portion of the photons comprising the light 704 strikes PCCs incorporated in the membranes 721, which then initiate the chemical steps resulting in electrons migrating to the anode 705 and protons passing through the membrane 721. Most preferably, the electrons will migrate to the nearest proximal anode trace. Electrical current thus passes from the anode traces to the anode trace integration unit 735. The circuitry of the anode trace integration unit 735 detects the electrons arriving from each anode trace and forwards this information to the display controller 736 over a signaling line 730. The trace integration unit 735 further allows the electrons to continue on to the cathode 706 over the electronic lead 732, where it is available for cathode compartment 708 reactions.

When programmed in accordance with a preferred embodiment of the invention, the display controller 736 so operates as to cause a replica of the initial image 713 to appear on the display device 738. The image quality will be affected by several factors, including the quantum efficiency of the membranes 721, the quality of the lens imaging arrangement 733, the number and density of membranes 721, as well as the degree to which the anode traces can electrically isolate membranes 721 to prevent electrons from "crossing over" to other anode traces, causing electrical noise and ultimately image distortion.

The light sensor and imager so described are expected to advantageously operate at a significantly higher QE than those using semiconductor transducers to generate electrons from photons, or other conventional design. Thus, without being bound by any one theory of operation, the ratio between the number of electrons delivered to the anode and number of photons incident to the membrane is expected to be significantly closer to 1:1.

Figure 8A:
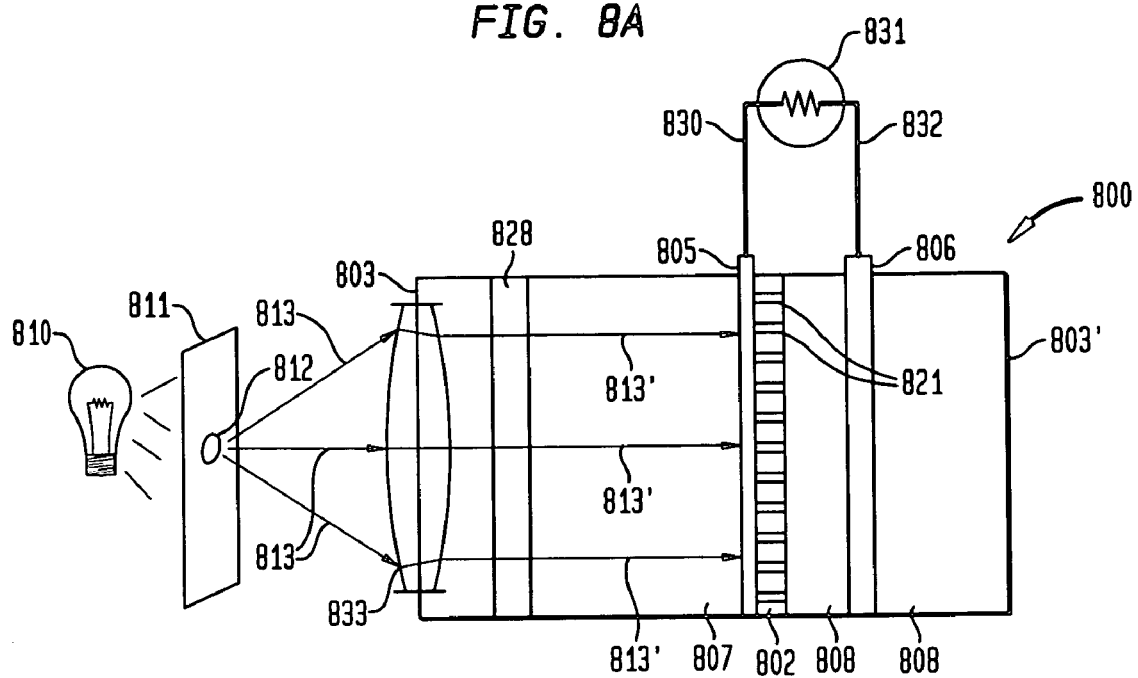
FIG. 8A depicts a color light sensor using a single filter in accordance with an embodiment of the present invention.

FIG. 8A depicts a color light sensor 800 in accordance with an embodiment of the present invention.

The color light sensor is analogous to the light sensor 600 of FIG. 6, with some notable exceptions. A with the light sensor 600, a point source of light 813 is provided by a light source 810 in combination with a screen 811 with a hole 812. The color light sensor 800 also includes an encasement 803' having at least one wall 803 with an opening into which a lens arrangement 833 is mounted, thereby completing and closing the open wall 803. Likewise, the lens arrangement 833 may include but is not limited to any single lens, such as a convex or concave lens, or any combination of lenses. It also includes any clear substance allowing any light to pass through, and may also comprise a light filter, depending upon the need of the application for which the color light sensor 800 is used. The encasement 803', wall with opening 803, and lens arrangement together enclose a space. This space is divided by a barrier 802, forming an anode compartment 807 and a cathode compartment 808.

The barrier 802 also includes a porous dielectric superstructure, the pores of which are filled with membranes 821, as with the light detector 600 of FIG. 6. The barrier 802 also includes plated or etched to the anode compartment-facing surface, electrically isolated from the cathode compartment, an anode 805. The anode 805 is likewise positioned to occupy only the part of the surface of the barrier 802 in between the pores filled with membranes 821.

The cathode compartment 808 includes a cathode 806. An electronic lead 830 connects the anode 805 with a current measuring device 831, with another electrical lead 832 connecting the current measuring device 831 to the cathode 806. The anode compartment 807 and cathode compartment 808 are filled with their respective chemistries, as described above.

A filter 820 is placed between the lens arrangement 833 and the barrier 802. This filter preferably selectively blocks the passage of light except for light in bandwidths for which the filter is designed. Thus the light 813 entering the color light sensor prior to striking the filter 820 might typically be composed of numerous wavelengths, whereas the filtered light 813' after the filter will include only one or more selected wavelengths.

In operation, light 813 from light source 810 passes through the lens arrangement 833 and filter 820. After the filter 820, the filtered light 813' passes through the remainder of the anode compartment 807, towards the barrier 802 and the membranes 821 within the pores. In a preferred embodiment, a portion of the photons comprising the filtered light 804 strikes PCCs incorporated in the membranes 821, which are then initiate the chemical steps resulting in electrons migrating to the anode 805 and protons passing through the membrane 821. The PCCs may alternatively or concurrently be free floating, as in the light sensor 600. Electrical current thus passes from the anode 805 through the electronic lead 830, through the current measuring device 831, through the other electronic lead 832 into the cathode 806, where it is available for cathode compartment reactions.

The current at the measuring device 831, is the count of electrons passing through this path, and therefore is related proportionally to the number of photons that have interacted with the PCCS. This is an effective measure of the amount of colored light entering the color light sensor 800.

Figure 8B:
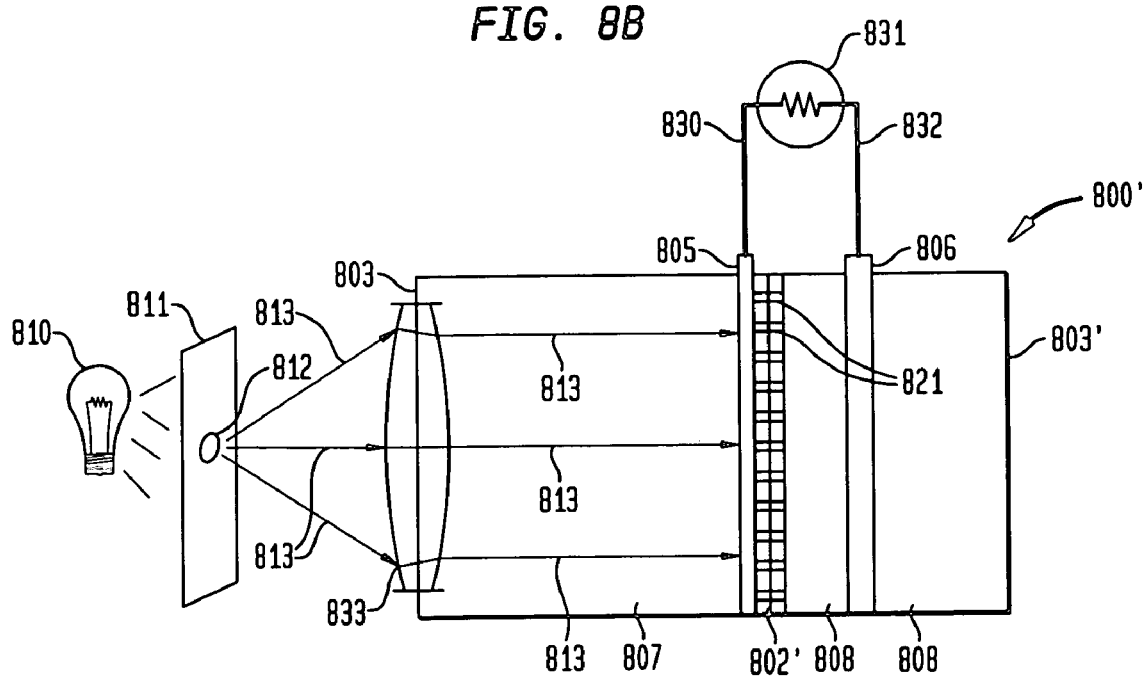
FIG. 8B depicts a color light sensor using multiple filters in accordance with an embodiment of the present invention.

A similar color light sensor 800' is depicted in FIG. 8B. This sensor 800' uses multiple small filters placed immediately in front of the membranes 821' of the barrier 802' instead of the filter of the previously described color light sensor 800.

Figure 8C:
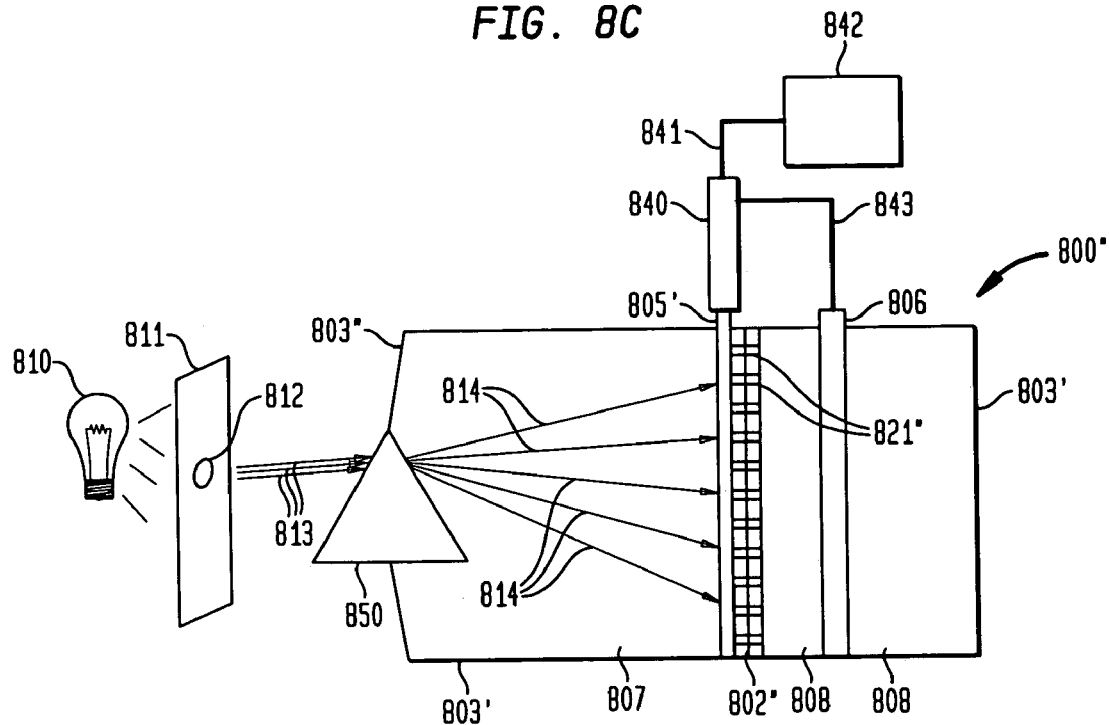
FIG. 8C depicts a color light sensor using a prism in accordance with an embodiment of the present invention.

Another embodiment of a color light sensor 800" is depicted in FIG. 8C. This sensor 800" differs from the color light sensor 800 of FIG. 8A in several ways. The wall with an opening 803" is modified to enable the mounting of a light-diffracting prism 850 instead of or, in an alternative embodiment, in addition to the lens arrangement (833 of FIG. 8A). This prism 850 is oriented and placed so as to spread the wavelengths of the incoming light 813 into its component colors. The physically separated colored light 814 then passes through the anode compartment 807 towards the barrier 802".

In an embodiment, the anode 805" is arranged differently from the anode 805 of color light sensor 800 of FIG. 8A.

The anode 805" of the color light sensor 800" is preferably in intimate proximity to the barrier 802". Moreover, the anode 805" is preferably disposed as an array of anode traces (not shown), each isolating a particular membrane 721, or alternatively, banded so that each trace coincides with a particular wavelength band of the diffracted light at the membranes 821". The anode traces comprising the anode 805" are advantageously drawn together and integrated at the anode trace integration unit 840.

The anode trace integration unit 840 functions in a similar manner with that of the anode trace integration unit 735 of the imager 700 of FIG. 7. It is also an electronic device that receives as input the various anode traces. Electrons arriving from each anode trace are counted by the anode trace integration unit 840, which then processes the counts to determine how many electrons arrived from each banded anode trace. This information is then forwarded the information to a recording/reporting device 842 over a signaling line 841. The recording/reporting device 842 is preferably a computer that allows access to and manipulation of the information so received. Instrument assemblies such as the trace integration unit 840, display recording/reporting device 842 and communication signaling line 841 are well known to those of ordinary skill in the art.

The cathode compartment 808 likewise includes a cathode 806. An electrical lead 843 connects the trace integration unit 840 to the cathode 806. The anode compartment 807 and cathode compartment 808 are filled with their respective chemistries, as described above.

In operation, light 813 from the light source 810 passes through the prism 850 and the anode compartment 814, towards the barrier 802" and the membranes 821" within the pores. In a preferred embodiment, a portion of the photons comprising the light 814 strikes PCCs incorporated in the membranes 821", which are then initiate the chemical steps resulting in electrons migrating to the anode traces 805 and protons passing through the membrane 821. Most preferably, the electrons will migrate to the nearest proximal anode trace. Electrical current thus passes from the anode traces to the anode trace integration unit 840. The circuitry of the anode trace integration unit 840 detects the electrons arriving from each anode trace and forwards this information to the recording/reporting device 842 over a signaling line 841. The trace integration unit 840 further allows the electrons from the anode traces to continue on to the cathode 806 over the electronic lead 843, where it is available for cathode compartment 808 reactions.

Figure 8D:
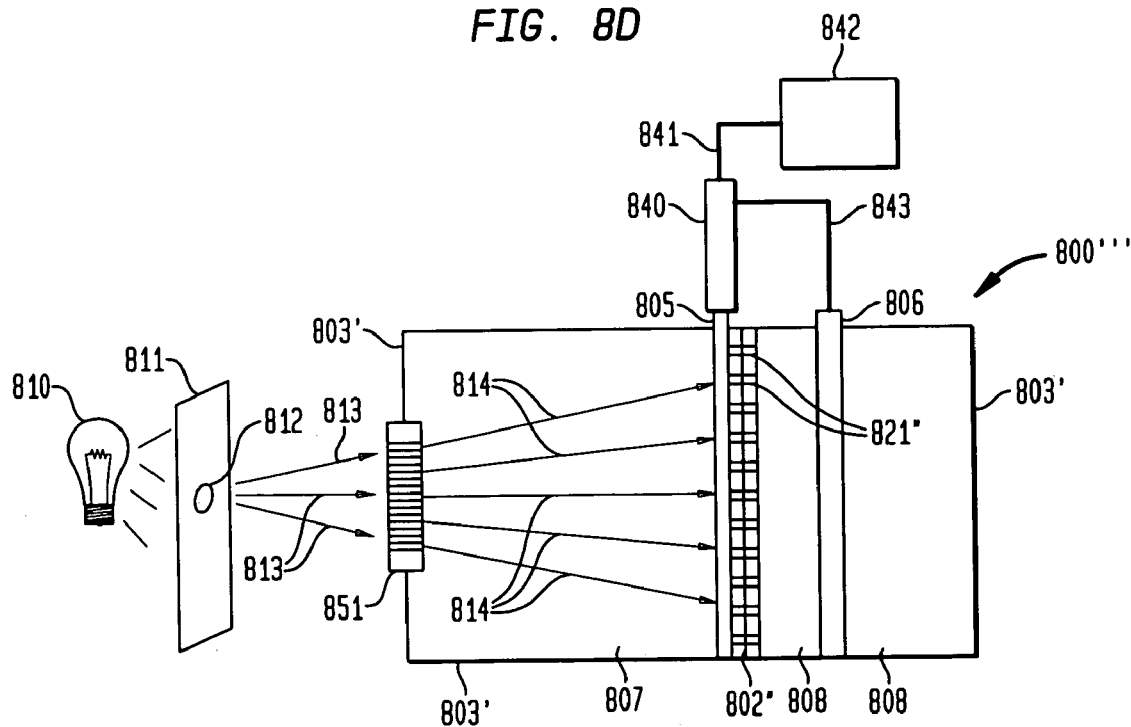
FIG. 8D depicts a color light sensor using a diffraction grating in accordance with an embodiment of the present invention.

In another embodiment of the invention, as depicted in FIG. 8D, a diffraction grating 851 is used instead of the prism 850 of FIG. 8C.

FIG. 9 depicts a functional schematic diagram of a color imager device 900 in accordance with a preferred embodiment of the invention. The color imager device 900 is similar to the imaging device 700 shown in FIG. 7, with some notable differences.

A screen or sheet 930 upon which a color image 931 is disposed is lighted sufficiently by a light source (not shown) so that light 904 from the image 931 passes to the color imager 900. The color imager 900 also includes an encasement 903' having at least one wall 903 with an opening into which a lens arrangement 933 is mounted, thereby completing and closing the open wall 903. The lens arrangement 933 similarly may include but is not limited to any single lens, such as a convex or concave lens, or any combination of lenses. It also includes any clear substance allowing any light to pass through, and may also comprise a light filter, depending upon the need of the application for which the color imager 700 is used. The diagram shows the lens arrangement 933 as inverting the image 931 by focusing, causing the light 904 to crisscross in the anode compartment 907. It is not necessary for the lens arrangement 933 to invert the image 913, and alternative embodiments may or may not do so. The encasement 903', wall with opening 903, and lens arrangement together enclose a space. This space is divided by a barrier 902', forming an anode compartment 907, and a cathode compartment 908.

The barrier 902' includes a porous dielectric superstructure, the pores of which are filled with membranes 921, preferably including PCCs, although the PCCs may alternatively or additionally be free floating within the anode compartment 907. The barrier 902' also includes plated or etched to the anode compartment-facing surface, electrically isolated from the cathode compartment, an anode 905. The anode 905 is arranged differently from the anode 605 of photon sensor 600 of FIG. 6.

The anode 905 of the color imaging device 900 is preferably in intimate proximity to the barrier 902'. Moreover, the anode 905 is preferably disposed as an array of anode traces (not shown), each isolating a particular membrane 921, preferably one anode trace per membrane 921.

The membranes 921 preferably are each associated with a filter (not depicted) for selectively allowing only light of a particular wavelength range or color to pass. Thus, light comprising multiple wavelength photons, first arrives at each filter, where only certain wavelengths are able to pass. The light then strikes the membrane 921. A particularly preferred embodiment used a repeating sequence of red, blue and green filters in a tight array to optimize the color image.

The anode traces comprising the anode 905 are advantageously drawn together and integrated at the anode trace integration unit 940.

The anode trace integration unit 940 is an electronic device, which receives as input the various anode traces. Electrons arriving from each anode trace are counted by the anode trace integration unit 940, which then forwards the information to a display controller 942 over a signaling line 941. The display controller 942 is preferably a computer that creates an image based on the information received from the trace integration unit 940 and produces an image that is communicated to a display device 944, over another signaling line 943. Instrument assemblies such as the trace integration unit 940, display controller 942, display device 944, and communication signaling lines 941, 943 are well known to those of ordinary skill in the art.

One advantageous use for the display controller is to normalize the signal from the trace integration unit 940. For example, if the membranes do not include equal amounts of PCC, or if the PCC interacts at varying rates for different wavelengths of light, anomalies will become evident in the resultant readings from varying anode trace lines. The display controller 940 used in conjunction with appropriate test pattern images, can computationally correct for these anomalies using normalization techniques commonly known in the art.

The cathode compartment 908 includes a cathode 906. An electrical lead 932 connects the trace integration unit 940 to the cathode 906. The anode compartment 907 and cathode compartment 908 are filled with their respective chemistries, as described above.

In operation, light 904 from the image 931 passes through the lens arrangement 933 and the anode compartment 907, towards the barrier 902 and the membranes 921 within the pores. In a preferred embodiment, a portion of the photons comprising the light 904 strikes PCCs incorporated in the membranes 921, which then initiate the chemical steps resulting in electrons migrating to the anode traces and protons passing through the membrane 921. Most preferably, the electrons will migrate to the nearest proximal anode trace. Electrical current thus passes from the anode traces to the anode trace integration unit 940. The circuitry of the anode trace integration unit 940 detects the electrons arriving from each anode trace and forwards this information to the display controller 942 over a signaling line 941. The trace integration unit 940 further allows the electrons to continue on to the cathode 906 over the electronic lead 932, where it is available for cathode compartment 908 reactions.

When programmed in accordance with a preferred embodiment of the invention, the display controller 942 so operates as to cause a replica of the initial image 931 to appear on the display device 944. As for the photon imaging device 700, image quality will be affected by several factors, including the quantum efficiency of the membranes 921, the quality of the lens imaging arrangement 933, the number and density of membranes 921, as well as the degree to which the anode traces can electrically isolate membranes 921.

The light sensor and imager so described are expected to advantageously operate at a significantly higher QE than those using semiconductor transducers to generate electrons from photons, or other conventional design. Thus, without being bound by any one theory of operation, the ration between the quantity of electrons delivered to the anode and number of photons incident to the membrane is expected to be significantly closer to 1:1.

The expected higher QE means that in a low-light application there is less of a need to rely on other low light imaging techniques, such as infra-red strobe light, or other enhancing techniques, to match the performance of conventional light sensors.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A light detector, comprising:
   a container having an anode compartment and a cathode compartment, the anode compartment having an array of anodes and the cathode compartment having a cathode;
   a transparent portion in the container that allows light into the anode compartment;
   a light diffracting device oriented to diffract light entering the anode compartment into incident component colored light, which then radiates onto a barrier supporting a membrane that separates the anode compartment and the cathode compartment, the membrane being able to allow protons to pass;
   the anode compartment(s) having a photon-converting compound, the photon-converting compound being associated with the membrane; and
   the barrier having an array of pores, the pores being filled or covered with the membrane, the barrier being composed of a dielectric material and having thereupon the array of anodes, each of which anode is plated to or in contact with the dielectric material and each of which anodes are adjacent to and electrically isolating one or more of the pores, the anodes further arranged to form bands positioned coincident with a portion of the barrier at which known colors of the incident component colored light are diffracted unto.

2. The light detector according to claim 1, wherein the photon-converting compound is a cytochrome having porphyrin rings containing a metal or metal ion.

3. The light detector according to claim 2, wherein the cytochrome is selected from the group consisting of chlorophylls, beta-carotene, or any molecule with a porphyrin ring that can react with $H_2O$ to form oxygen.

4. The light detector according to claim 1, in which the anode compartment further includes electron carriers.

5. The light detector according to claim 1, in which the anode compartment further includes electron transfer mediators.

6. The light detector according to claim 5, in which the electron transfer mediators are coated onto the anode.

7. The light detector according to claim 1, in which the transparent portion includes one or more lenses.

8. The light detector according to claim 1, further comprising a current measuring device for measuring the flow of electrons from each of the anodes to the cathode.

9. The light detector according to claim 1, wherein the light diffracting device is a prism.

10. The light detector according to claim 1, wherein the light diffracting device includes a prism and one or more lenses.

11. The light detector according to claim 1, wherein the light diffracting device is a diffraction grating.

12. The light detector according to claim 1, wherein the light diffracting device includes a diffraction grating and one or more lenses.

13. A method of detecting light, comprising:
   providing a container having an anode compartment, the anode compartment having a plurality of anodes, the container further having a cathode compartment, the cathode compartment having a cathode, each anode having an anode trace and having an electrical connection with the cathode
   the anode compartment separated from the cathode compartment by a barrier having a plurality of sets of pores, the sets of pores being filled or covered with a membrane, the membrane allowing protons to pass, the membrane having a photon converting compound associated therewith;
   passing light into the anode compartment;
   filtering light entering the anode compartment prior to arriving at the membrane using a plurality of light filters interposed between the anode compartment and the membrane to provide differential light color sampling at the sets of pores, the anodes associated with each color-differentiated set of pores being placed proximate to the associated set of pores, thereby differentiating the anodes electronically;
   freeing electrons from a photon-converting compound when the P-GC-s photon-converting compound are is struck by light in the anode compartment; and
   passing the electrons to the anode and then over the electrical connection to the cathode.

14. The method of detecting light according to claim 13, wherein the passing of electrons to the anode is assisted by electron carriers.

15. The method of detecting light according to claim 14, in which the passing of electrons to the anode is assisted by electron transfer mediators.

16. The method of detecting light according to claim 15, in which the electron transfer mediators are coated onto the anodes.

17. The method of detecting light according to claim 13, in which the membrane is a biocompatible membrane.

18. The method of detecting light according to claim 13, in which the membrane is a proton tunneling membrane.

19. The method of detecting light according to claim 13, in which the membrane is a proton exchange membrane.

20. The method of detecting light according to claim 13, in which the transparent portion includes one or more lenses.

21. The method of detecting light according to claim 13, further comprising measuring the number of electrons flowing from each anode trace to the cathode using a current measuring device disposed therebetween.

22. A method of detecting light, comprising:
providing a container having an anode compartment, the anode compartment having an array of anodes, the container further having a cathode compartment, the cathode compartment having a cathode, each anode having an anode trace and having an electrical connection with the
the anode compartment separated from the cathode compartment by a barrier having an array of pores, the pores being filled or covered with a membrane, the membrane allowing protons to pass,
different anodes being associated with different spacial areas of the array of pores,
the anode(s) associated with each spatial area of pores being differentiated electronically by arranging the anodes proximate to the associated area of pores,
the anode traces for each anode associated with each spacial area of pores being electrically connected to the cathode by a unique electrical connection, thereby electrically isolating the anode traces;
passing light into the anode compartment;
diffracting light entering the anode compartment(s) using a light diffracting device oriented to diffract light entering the anode compartment into component colored light, which then radiates onto the barrier containing the array of pores with the membrane separating the anode compartment from the cathode compartment;
freeing electrons from a photon-converting compound when the photon-converting compound is struck by light in the anode compartment;
passing the electrons to the anode and then over an electrical connection to the cathode; and
counting the number of electrons moving from each anode trace to the cathodes using a current measuring device disposed therebetween.

23. The method of detecting light according to claim 22, wherein the anodes and their associated areas of the array of pores are positioned so that each spatial area encompasses a known portion of the component light pattern incident on the barrier.

24. The method of detecting light according to claim 23, wherein the light diffracting device is a prism.

25. The method of detecting light according to claim 23, wherein the light diffracting device includes a prism and one or more lenses.

26. The method of detecting light according to claim 23, wherein the light diffracting device is a diffraction grating.

\* \* \* \* \*